United States Patent
Banach et al.

(10) Patent No.: US 11,772,661 B2
(45) Date of Patent: Oct. 3, 2023

(54) METHODS AND APPARATUSES FOR SUPPORTING VEHICLE-TO-INFRASTRUCTURE COMMUNICATION

(71) Applicant: Aptiv Technologies Limited, St. Michael (BB)

(72) Inventors: Marzena Banach, Puszczykowo (PL); Rafal Dlugosz, Lubon (PL); Piotr Bogacki, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 18/048,223

(22) Filed: Oct. 20, 2022

(65) Prior Publication Data

US 2023/0131659 A1 Apr. 27, 2023

(30) Foreign Application Priority Data

Oct. 22, 2021 (EP) ........................ 21204211

(51) Int. Cl.
*B60W 40/12* (2012.01)

(52) U.S. Cl.
CPC .......... *B60W 40/12* (2013.01); *B60W 2552/00* (2020.02); *B60W 2554/4041* (2020.02); *B60W 2554/80* (2020.02); *B60W 2556/45* (2020.02)

(58) Field of Classification Search
CPC ............. B60W 40/12; B60W 2552/00; B60W 2554/4041; B60W 2554/80; B60W 2556/45
USPC ............................................ 701/1
See application file for complete search history.

(56) References Cited

U.S. PATENT DOCUMENTS

| | | | |
|---|---|---|---|
| 2007/0005609 A1* | 1/2007 | Breed | B60W 50/00 |
| 2010/0106356 A1* | 4/2010 | Trepagnier et al. | G05D 1/0248 701/25 |

(Continued)

FOREIGN PATENT DOCUMENTS

| | | |
|---|---|---|
| EP | 3078937 A1 | 10/2016 |
| EP | 3825714 A2 | 5/2021 |

(Continued)

OTHER PUBLICATIONS

Amini, et al., "Improving GPS-Based Vehicle Positioning for Intelligent Transportation Systems", IEEE Intelligent Vehicles Symposium (IV), 2014, Jun. 2014, 7 pages.

(Continued)

*Primary Examiner* — Atul Trivedi
(74) *Attorney, Agent, or Firm* — Colby Nipper PLLC

(57) ABSTRACT

A method including determining a direct distance between the vehicle position and a position of the roadside unit and a planar distance between the vehicle position in a horizontal plane containing the vehicle position, and a projection of the position of the roadside unit onto the plane. The method further includes calculating a height of a roadside unit relative to the vehicle position using the direct distance and the planar distance determined for the vehicle position. The method also includes setting a value indicative of the height of the roadside unit relative to the vehicle position as a height correction value and storing the height correction value of the vehicle position in association with information indicative of the vehicle position as the height correction function.

20 Claims, 13 Drawing Sheets

(56) References Cited

U.S. PATENT DOCUMENTS

| | | | |
|---|---|---|---|
| 2010/0280751 A1* | 11/2010 | Breed | G08G 1/161 |
| | | | 701/414 |
| 2015/0210312 A1* | 7/2015 | Stein et al. | B62D 6/00 |
| | | | 701/41 |
| 2017/0313304 A1* | 11/2017 | Shiraishi et al. | B60W 30/04 |
| 2019/0121522 A1* | 4/2019 | Davis et al. | G06V 40/28 |
| 2020/0120444 A1 | 4/2020 | Banach et al. | |
| 2020/0174107 A1* | 6/2020 | Briggs et al. | H04N 23/90 |
| 2020/0327343 A1* | 10/2020 | Lund et al. | H04W 4/46 |
| 2020/0369274 A1* | 11/2020 | Mizuno et al. | G01S 13/931 |
| 2022/0107415 A1* | 4/2022 | Remelius | A61B 5/6826 |
| 2022/0281456 A1* | 9/2022 | Giovanardi et al. | B60W 30/16 |

FOREIGN PATENT DOCUMENTS

| | | | |
|---|---|---|---|
| KR | 20170071207 A | 6/2017 | |
| WO | 2018126083 A1* | 7/2018 | B60W 40/06 |

OTHER PUBLICATIONS

Banach, "Positioning Improving of RSU Devices Used in V2I Communication in Intelligent Transportation System", 14th Federated Conference on Computer Science and Information Systems} (FedCSIS), Sep. 2019, pp. 73-79.

Banach, et al., "Calculation of descriptive statistics by devices with low computational resources for use in calibration of V2I system", 24th International Conference on Methods and Models in Automation and Robotics (MMAR), Aug. 2019, 6 pages.

Banach, et al., "Hardware Implementation of Selected Statistical Quantities for Applications in Automotive V2I Communication System", IEEE 31th International Conference on Microelectronics (MIEL 2019), 0912019, 4 pages.

Banach, et al., "Real-time Locating Systems for Smart City and Intelligent Transportation Applications", 30th International Conference on Microelectronics (MIEL), Nis, Serbia, Oct. 2017, pp. 231-234.

Butakov, et al., "Personalized Driver Assistance for Signalized Intersections Using V2I Communication", IEEE Transactions on Intelligent Transportation Systems, Vol. 17, Jul. 2016, pp.1910-1919.

Fascista, et al., "A Localization Algorithm Based on V2I Communications and AOA Estimation", IEEE Signal Processing Letters, Vol. 24, Issue: 1, 2017), Jan. 2017, pp. 126-130.

Gheorghiu, et al., "Messaging capabilities of V2I networks", Jan. 2018, 9 pages.

Hassan, et al., "Vehicle Localization System based on IR-UWB for V2I Applications", 8th International Conference on Computer Engineering & Systems (ICCES), Nov. 2013, 4 pages.

Llorente, et al., "UWB technology for safety-oriented vehicular communications", Proc. SPIE 9807, Optical Technologies for Telecommunications 2015, Mar. 2016, 9 pages.

Olavarri-Monreal, et al., "Implementation and Evaluation of a Traffic Light Assistance System Based on V2I Communication in a Simulation Framework", Journal of Advanced Transportation, Vol. 2018, Feb. 2018, 12 pages.

Wang, et al., "A Tightly-Coupled GPS/INS/UWB Cooperative Positioning Sensors System Supported by V2I Communication", Nov. 4, 2020, 16 pages.

"Extended European Search Report", EP Application No. 21204211.3, Mar. 22, 2022, 9 pages.

\* cited by examiner

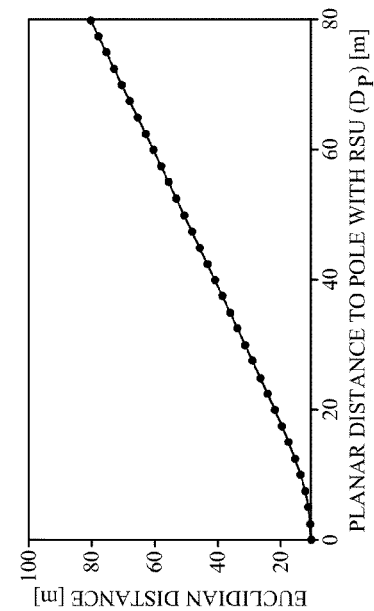
FIG. 6B
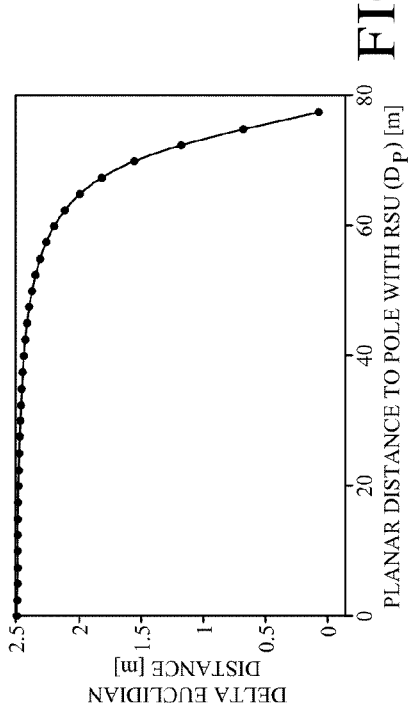
FIG. 6D
FIG. 6E
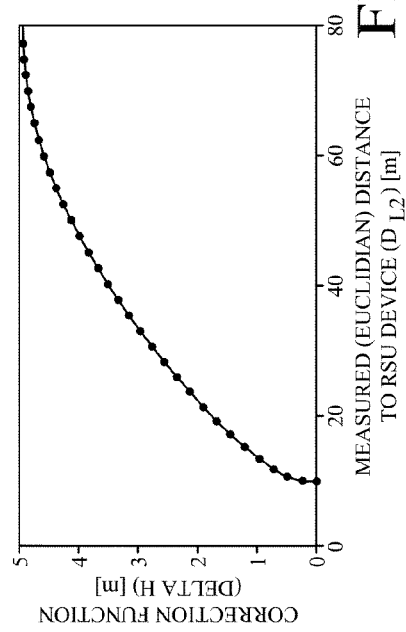
FIG. 6A
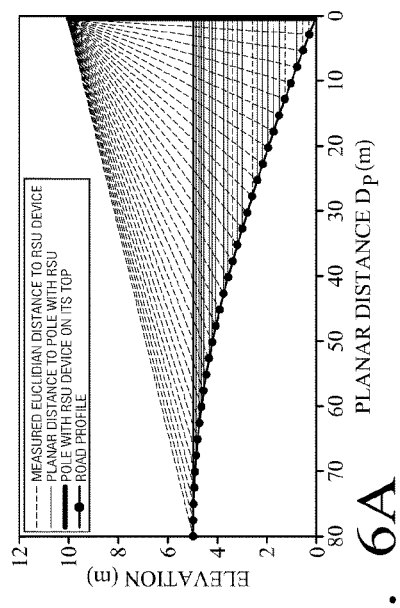
FIG. 6C

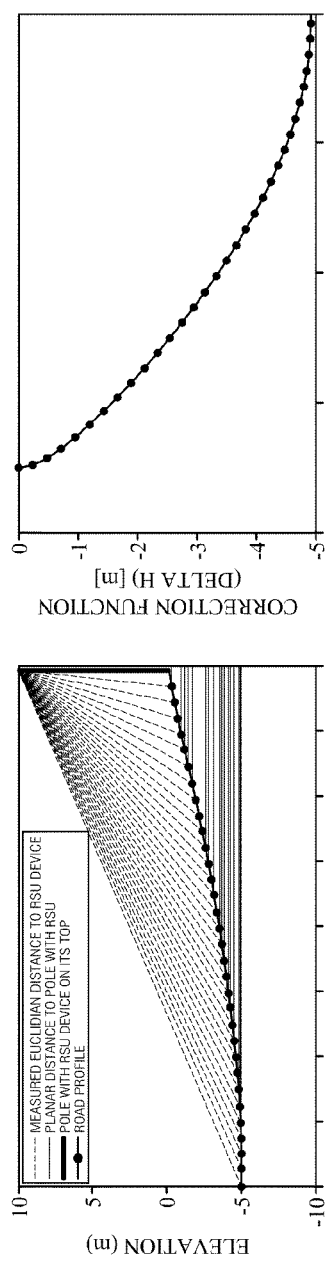
FIG. 7A
FIG. 7B
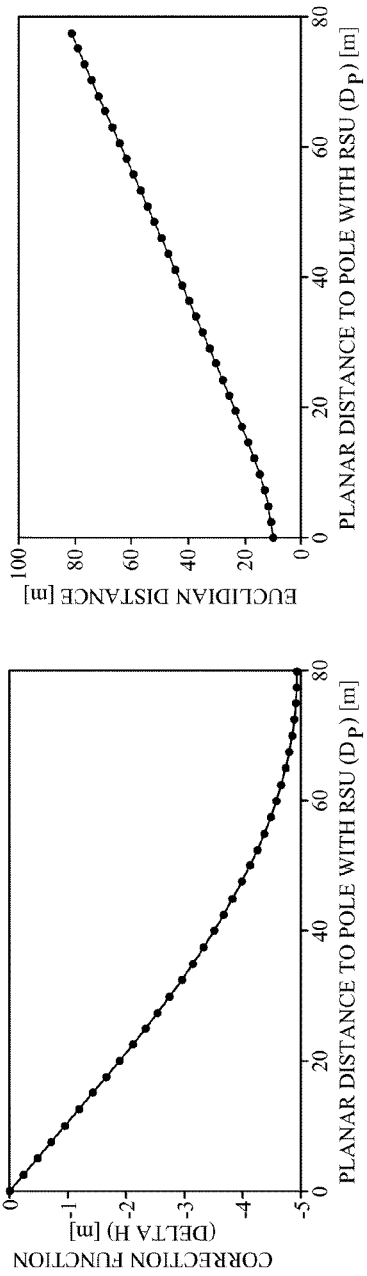
FIG. 7C
FIG. 7D
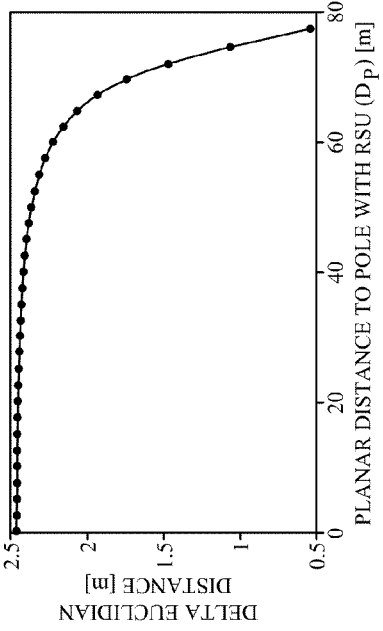
FIG. 7E

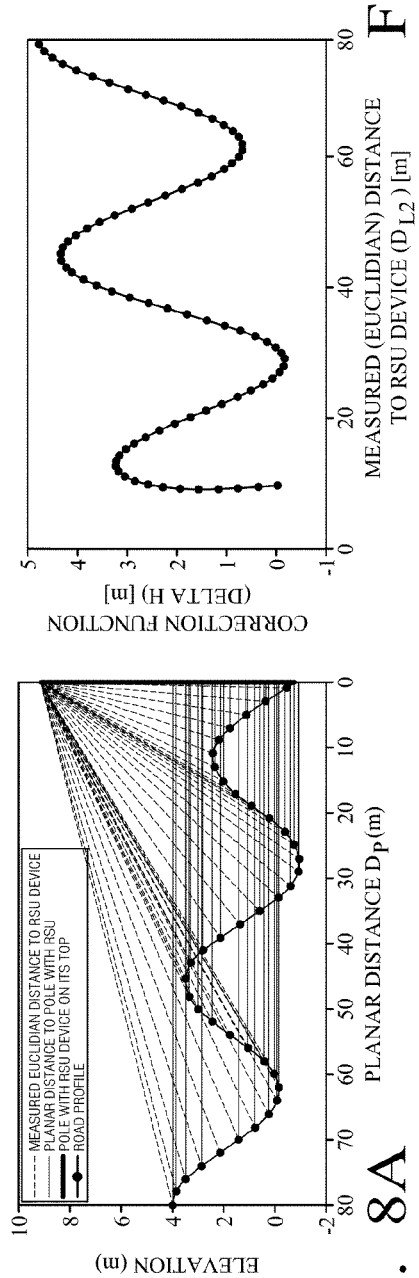
FIG. 8A
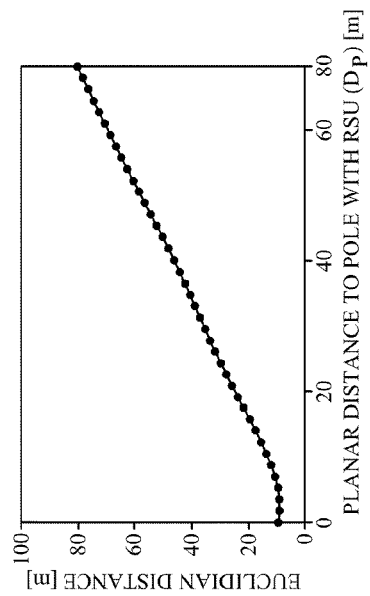
FIG. 8B
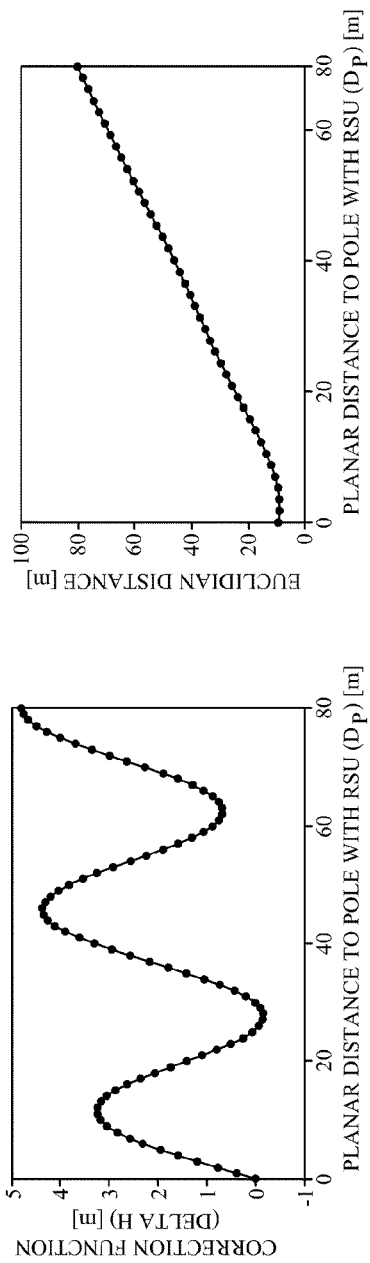
FIG. 8C
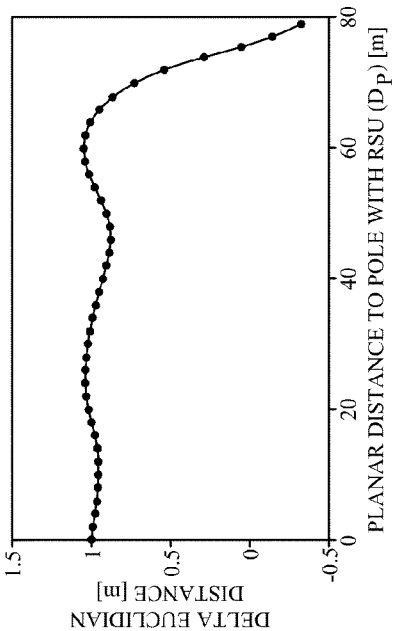
FIG. 8D
FIG. 8E

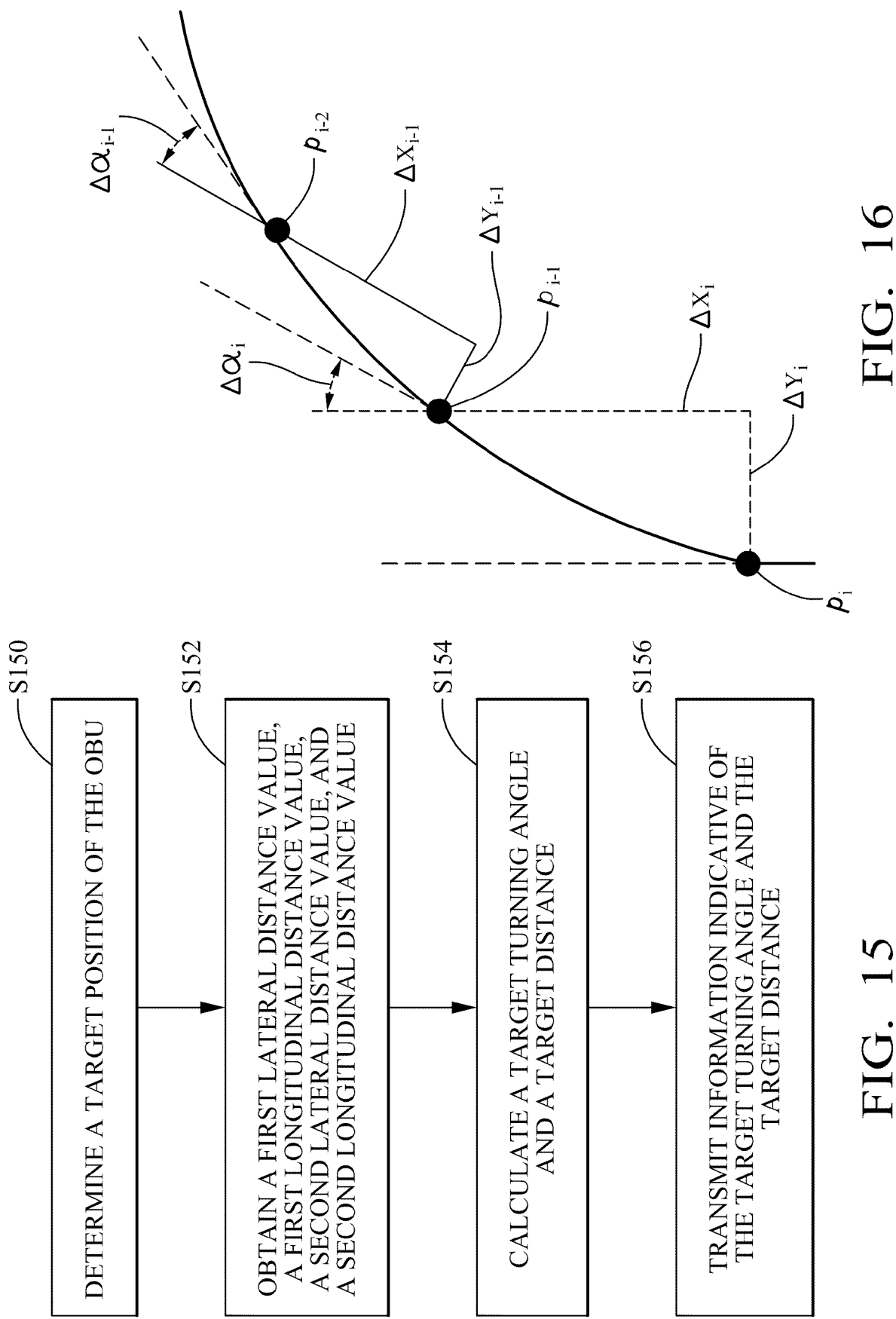

METHODS AND APPARATUSES FOR SUPPORTING VEHICLE-TO-INFRASTRUCTURE COMMUNICATION

INCORPORATION BY REFERENCE

This application claims priority to European Patent Application No. 21204211.3, filed Oct. 22, 2021, the disclosure of which is incorporated by reference in its entirety.

BACKGROUND

Autonomous driving functionality and, more generally, advanced driver-assistance system (ADAS) functionality are features of modern vehicles which has been attracting increasing interest. ADAS functionality may assist a driver in controlling a vehicle by assisting with driving, parking and/or other functions of the vehicle. As a specific aspect of ADAS functionality, autonomous driving functionality may allow the driver of a host vehicle (i.e., the vehicle to be controlled) to hand over the control of both acceleration and steering of the vehicle to an autonomous driving system, which may be provided with, for example, a target velocity and headway time or more detailed information so as to follow an intended route.

An ADAS may be adapted to react appropriately to other road-users, pedestrians, possible obstacles (e.g., a collision) and/or environmental conditions (e.g., heavy rain or snow). Accordingly, ADASs are generally configured to obtain information from equipment such as radars, cameras, inertial measurement units, etc., in order to collect data about the vehicle and its environment and generate a high-level environment model describing the road on which the vehicle is travelling and the traffic on it.

In currently used ADAS functions, a vehicle may determine its position with respect to the road lanes, based on the data received from its own onboard sensors. Such a self-positioning is based on the detection of lane markers or lines painted on the road and in some cases also road barriers. Based on these detections, a road model is created, being a part of the vehicle's wider surrounding model.

However, this approach has some limitations. For example, the distance range over which lane lines are visible in the vision stream (i.e., discernible by the vehicle's sensors) may be limited by the resolution of the applied cameras and other sensors deployed in the vehicle, such that traffic lane estimation with sufficient precision is only achievable within several dozen meters ahead. In case of heavier traffic on a given road segment (e.g., in the presence of traffic jams), visibility may be further limited only to a few meters.

Furthermore, the lines on the road may be of a poor quality. For example, painted lines may be rubbed off or fade over long periods of time between repainting. Such lines may also be poorly visible at night, during fog or in the winter due to the snow covering the road. This may lead to many ambiguities which is a great challenge for ADAS, particularly vision safety features.

In addition, GPS-based positioning solutions have their limitations. In particular, GPS signal may be weak in situations such as, for example, cities with densely built-up areas, tunnels, or thickly wooded areas.

In view of such limitations, it is advantageous to provide additional means of collecting data about a vehicle and its environment.

As one such means, Vehicle-to-Infrastructure (V2I) systems may be applied in ADAS functions and as support for autonomous driving of vehicles. V2I systems may, for example, be adapted to provide warning messages to passing vehicles about dangerous situation on the road, such as, for example, the possibility of collision with a pedestrian or other vehicle, an accident ahead, etc. By way of further example, V2I systems may be configured to provide information to vehicles for use in optimizing the vehicle's route through a city, etc.

SUMMARY

Example aspects herein generally relate to the field of advanced driver-assistance systems and autonomous driving and, in particular, to techniques for determining positions of autonomous vehicles on the road based on the Vehicle-to-Infrastructure (V2I) communication technology.

More specifically, example aspects herein relate to a method of determining a height correction function, a method of determining a curvature correction function, a method performed by a roadside unit and a corresponding roadside unit, and a method performed by an onboard unit and a corresponding onboard unit.

There is disclosed herein, in accordance with a first aspect herein, a method of determining a height correction function associating each of a plurality of vehicle positions to a respective height correction value. The plurality of vehicle positions are within a predetermined region defined relative to a roadside unit. The method comprises determining, for each of the plurality of vehicle positions: a direct distance between the vehicle position and a position of the roadside unit; and a planar distance between the vehicle position in a horizontal plane containing the vehicle position, and a projection of the position of the roadside unit onto the plane. The method further comprises calculating, for each of the plurality of vehicle positions, a height of the roadside unit relative to the vehicle position using the direct distance and the planar distance determined for the vehicle position. The method further comprises setting, for each of the plurality of vehicle positions, a value indicative of the height of the roadside unit relative to the vehicle position as a height correction value; and storing in the roadside unit, for each of the plurality of vehicle positions, the height correction value of the vehicle position in association with information indicative of the vehicle position as the height correction function.

The roadside unit may be positioned at a predetermined height relative to ground level. The method in accordance with the first aspect may further comprise calculating, for each of the plurality of vehicle positions, a difference between the height of the roadside unit relative to the vehicle position and the predetermined height, wherein, for each of the plurality of vehicle positions, the value indicative of the height of the roadside unit relative to the vehicle position is the difference calculated for the vehicle position.

For each of the plurality of vehicle positions, the information indicative of the vehicle position may comprise the direct distance between the vehicle position and the roadside unit.

The height correction function may be stored in the roadside unit in the form of a look-up table.

For each of the plurality of vehicle positions, the direct distance may be determined using a time-of-flight sensor and/or a laser rangefinder.

For each of the plurality of vehicle positions, the planar distance may be determined using a laser rangefinder.

There is disclosed herein, in accordance with a second aspect herein, a method of determining a curvature correction function associating each of the plurality of vehicle positions to a respective lateral distance value and a respective longitudinal distance value. The plurality of vehicle positions are within a predetermined region defined relative to a roadside unit and comprising a sequence of positions defining a trajectory of a vehicle along a road. Each of the plurality of vehicle positions has an associated direction of travel. The method comprises determining, for each pair of consecutive vehicle positions among the plurality of vehicle positions, an angular distance between the respective directions of travel associated with the pair of consecutive vehicle positions. The method further comprises calculating, for each of the plurality of vehicle positions, a total angular distance between the direction of travel associated with the vehicle position and a direction of travel associated with a vehicle position closest to a position of the roadside unit. The method further comprises calculating, for each of the plurality of vehicle positions, the lateral distance value and the longitudinal distance value based on the total angular distance and a planar distance between the vehicle position in a horizontal plane containing the vehicle position, and a projection of the position of the roadside unit onto the plane; and storing in the roadside unit, for each of the plurality of vehicle positions, the lateral distance value and the longitudinal distance value of the vehicle position in association with information indicative of the vehicle position as the curvature correction function.

There is disclosed herein, in accordance with a third aspect herein, a method performed by a roadside unit. The method comprises receiving, from the onboard unit, a signal comprising information indicative of a direct distance between the onboard unit and the roadside unit; and obtaining, using a stored height correction function determined according to the method of the first aspect herein, a height correction value corresponding to the position of the onboard unit based on the direct distance. The method further comprises transmitting, to the onboard unit, a signal comprising information indicative of the height correction value; or calculating, using the height correction value and the direct distance, a planar distance between a position of an onboard unit in a horizontal plane, containing the position of the onboard unit, and a projection of a position of the roadside unit onto the plane, and transmitting, to the onboard unit, a signal comprising information indicative of the planar distance.

The roadside unit may be positioned at a predetermined height relative to ground level. The height correction value may comprise a difference between a height of the roadside unit relative to the position of the onboard unit and the predetermined height. Calculating the planar distance may further comprise using the predetermined height.

The method in accordance with the third aspect may further comprise receiving, from the onboard unit, at least one signal comprising information identifying the onboard unit; and transmitting, to the onboard unit, a response signal in respect of each of the at least one signal.

Each response signal may include information identifying the roadside unit and/or information identifying the onboard unit.

The roadside unit may transmit each response signal after a delay of a predetermined amount of time.

The predetermined amount of time may be changed as ambient temperature changes.

The response signal may further comprise information indicative of the predetermined amount of time.

The method in accordance with the third aspect may further comprise determining a target position of the onboard unit; obtaining, using a stored curvature correction function determined according to the method in accordance with the second aspect herein, a first lateral distance value and a first longitudinal distance value corresponding to the position of the onboard unit and a second lateral distance value and a second longitudinal distance value corresponding to the target position; calculating a target turning angle and a target distance based on the first lateral distance value, the first longitudinal distance value, the second lateral distance value, and the second longitudinal distance value; transmitting, to the onboard unit, information indicative of the target turning angle and the target distance for use in controlling a vehicle in which the onboard unit is mounted to travel towards the target position.

There is disclosed herein, in accordance with a fourth aspect herein, a roadside unit comprising a transmitting/receiving section, a control section, and a memory section. The control section is configured to control the roadside unit to perform a method in accordance with the third aspect herein.

There is disclosed herein, in accordance with a fifth aspect herein, a method performed by an onboard unit of determining a planar distance between a position of the onboard unit in a horizontal plane containing the position of the onboard unit, and a projection of a position of a roadside unit onto the plane. The method comprises transmitting, to the roadside unit, a signal comprising information indicative of a direct distance between the onboard unit and the roadside unit. The method further comprises receiving, from the roadside unit, a signal comprising information indicative of a height correction value corresponding to the position of the onboard unit based on the direct distance and obtained using a height correction function determined according to the method of the first aspect herein, and calculating the planar distance using the height correction value and the direct distance; or receiving, from the roadside unit, a signal comprising information indicative of the planar distance calculated using the height correction value.

The method in accordance with the fifth aspect may further comprise receiving, from the roadside unit, a signal comprising information indicative of a predetermined height relative to ground level at which the roadside unit is positioned. The height correction value may comprise a difference between a height of the roadside unit relative to the position of the onboard unit and the predetermined height. Calculating the planar distance may further comprise using the predetermined height.

The method in accordance with the fifth aspect may further comprise transmitting, to the roadside unit, a signal comprising information identifying the onboard unit; receiving, from the roadside unit, a response signal; and calculating the direct distance between the onboard unit and the roadside unit based on an elapsed time between transmitting the signal and receiving the response signal.

The method in accordance with the fifth aspect may further comprise repeating the above steps to calculate a direct distance for each of at least two different positions of the onboard unit, the at least two different positions of the onboard unit including the position of the onboard unit; and determining the position of the onboard unit relative to the position of the roadside unit based on the respective planar direct distances calculated for each of at least two different positions of the onboard unit.

The signal comprising information indicative of a direct distance between the onboard unit and the roadside unit may further comprise information indicative of the position of the onboard unit relative to the position of the roadside unit.

The method in accordance with the fifth aspect may further comprise receiving, from the roadside unit, information indicative of a target turning angle and a target distance for use in controlling a vehicle in which the onboard unit is mounted to travel towards a target position.

There is disclosed herein, in accordance with a sixth aspect herein, an onboard unit comprising a transmitting/receiving section, a control section, and a memory section. The control section is configured to control the onboard unit to perform a method in accordance with the fifth aspect herein.

BRIEF DESCRIPTION OF THE DRAWINGS

Embodiments of the disclosure will now be explained in detail, by way of non-limiting example only, with reference to the accompanying figures, described below. Like reference numerals appearing in different ones of the figures can denote identical or functionally similar elements, unless indicated otherwise.

FIGS. 6A, 6B, 6C, 6D, and 6E are schematic illustrations showing in detail the relationship between direct distance, planar distance, and height for a case in which the vehicle position is on an elevated level with respect to the position of the infrastructure element on which the RSU is mounted.

FIGS. 7A, 7B, 7C, 7D, and 7E are schematic illustrations showing in detail the relationship between direct distance, planar distance, and height for a case in which the vehicle position is on a depressed level with respect to the position of the infrastructure element on which the RSU is mounted.

FIGS. 8A, 8B, 8C, 8D, and 8E are schematic illustrations showing in detail the relationship between direct distance, planar distance, and height for a case in which the height correction function is not monotone.

FIG. 15 is a flow diagram illustrating a process performed by a roadside unit, in accordance with an example embodiment herein.

FIG. 16 illustrates an example of values $\Delta x_i$ and $\Delta y_i$ between two consecutive vehicle positions $p_i$ and $p_{i-1}$ and values $\Delta x_{i-1}$ and $\Delta y_{i-1}$ between two consecutive vehicle positions $p_{i-1}$ and $p_{i-2}$.

DETAILED DESCRIPTION

Figure 1:
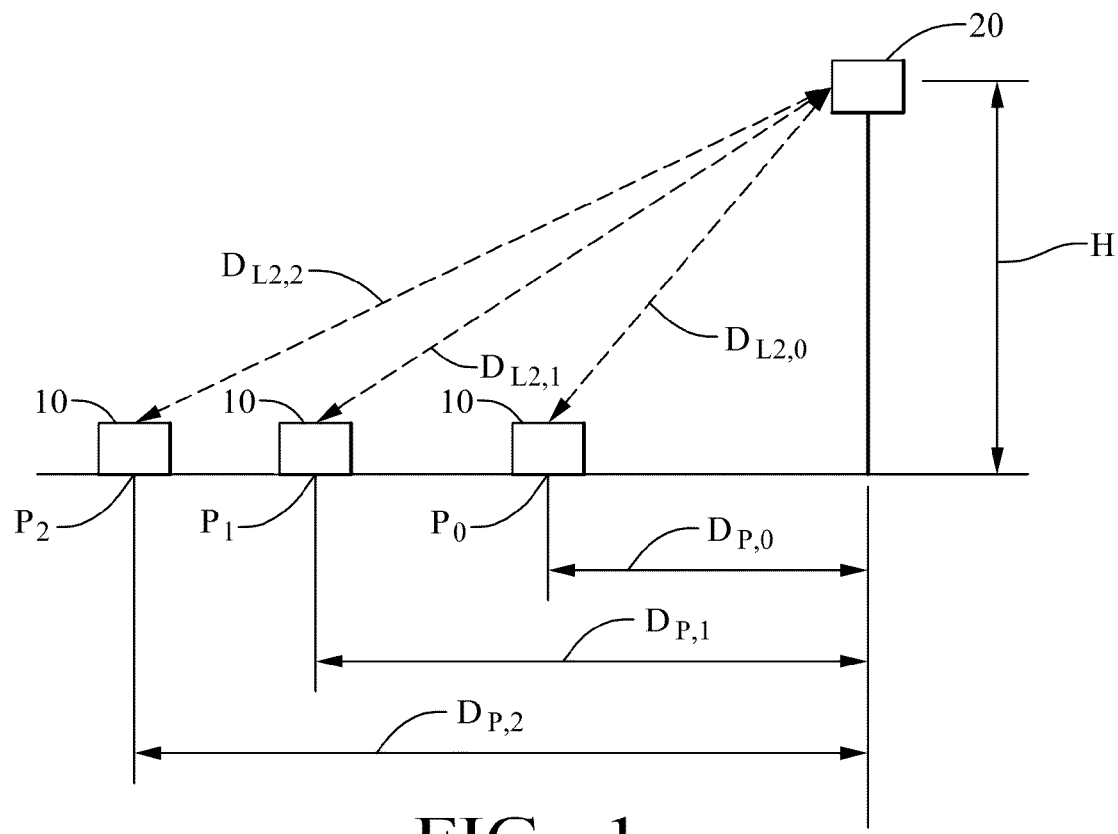
FIG. 1 is a schematic illustration showing the relationship between direct distance, planar distance, and height in an ideal case.

One of the potential use cases of V2I technology in supporting ADAS functionality is the creation of virtual tracks, in which a system of evenly deployed V2I communication device, which may be referred to as roadside units (RSU), communicate with a vehicle that is also equipped with a V2I communication device, which may be referred to as an onboard unit (OBU), so as to keep the vehicle on the predefined course on the road.

A predefined course can be understood as a sequence of vehicle positions defining a trajectory of a vehicle along a road, that is a series of consecutive location points with respect to the road edges that are transferred to the vehicle in order to cause the vehicle to follow an intended route. Such vehicle positions or location points should generally be accurate enough, as far as both longitudinal ('x' direction) and lateral ('y' direction) positions are concerned, so that the explicit and short-term trajectory for all the upcoming manoeuvres may be determined.

In particular, a solution is proposed, in which a group of RSU devices forms a system or network of permanently fixed V2I transponders that function to enable a local navigation in the terrain, largely independent of GPS system. Such solutions may be particularly beneficial in locations where GPS signal is weak.

A network of evenly deployed V2I transponders along traffic routes may help to assign intermediate target positions for the vehicles (or other moving objects) that are within this network's range and have a compatible technology onboard. These intermediate positions may be treated as short-distance destinations for moving autonomous vehicles or vehicles that make use of selected features of autonomous driving or selected ADAS functions, e.g., ACC / TJA or LC.

Therefore, such proposed solutions can support ADAS functions that rely on the precise location with respect to the road and its surroundings. These functions include, for example, Line Departure Warning (LDW), Autonomous Emergency Breaking (AEB), Lateral Control (LC), Adaptive Cruise Control (ACC), Traffic Jam Assist (TJA), Traffic Sign Recognition (TSR), Intersection Assist (IA), etc.

As such, a system of V2I transponders may provide an effective solution to the above-mentioned problems. However, in order to implement such V2I solutions for application in ADAS function, it is necessary to define an adequate architecture and operation. A further requirement for facilitating dissemination of such solution is to reduce the costs of creating, assembling, and maintaining such a system based on V2I technology.

In general, such V2I solutions could contribute to the positioning aspects of ADAS functionality by using distances measured between RSU and OBU devices. An OBU may be mounted in the specific location of the vehicle. An RSU may, for example, be mounted on elements of urban lighting infrastructure, such as is available in almost all types of communication routes. Such elements are poles with lighting lamps, available practically everywhere in cities and in urbanized areas. More generally, an RSU may be mounted on any suitable element of infrastructure (e.g., telephone poles, public buildings, traffic lights, road signs, etc.).

A distance between an RSU and an OBU may be determined using appropriate telecommunications technologies that allow a time it takes an electromagnetic wave to travel from the vehicle to RSU and back to be measured or any other suitable means. Such techniques allow a direct Euclidean distance (also referred to as a direct distance herein) between the RSU and the OBU to be measured. Such a direct distance will account not only for the lateral and longitudinal components of the distance between the OBU and the RSU, but also for the difference in height between the OBU and the RSU.

However, the high-level environment model used by vehicles having autonomous driving and/or other ADAS functionalities are generally defined only or primarily in the longitudinal and lateral directions with respect to the vehicle. As such, there is a need to project such measured direct distances to the plane defined by the longitudinal and lateral directions with respect to the vehicle so that the position of the RSU relative to the OBU may be appropriately defined within the environment-model.

That is, it becomes necessary to determine a planar distance between the position of the OBU in a horizontal plane containing the OBU, and a projection of the position of the RSU onto the plane. This may take the form of, for example, the distance in the plane between the position of the OBU and the mounting position on the ground of a light pole, on which this RSU is attached.

Knowing the distance to the RSU and the height of the light pole on which the RSU is mounted, it is possible to calculate such a planar distance using, for example, Pythagoras theorem.

FIG. 1 is schematic illustration showing the relationship between direct distance $D_{L2,i}$, planar distance $D_{P,i}$, and height H in an ideal case. In particular, an ideal case occurs where the surface on which the vehicle is travelling is flat.

As shown in FIG. 1, as a vehicle, on which an OBU 10 is mounted, travels in the vicinity of an RSU 20, a direct distance $D_{L2,0}$, $D_{L2,1}$, $D_{L2,2}$ is measured for each of three vehicle positions, $P_0$, $P_1$, and $P_2$. Each of vehicle positions, $P_0$, $P_1$, and $P_2$ represent a position of the vehicle, on which OBU 10 is mounted, at a given moment in time, e.g., as the vehicle travels.

At each of positions $P_0$, $P_1$, $P_2$, the height of the RSU 20 relative to the height of the OBU 10 is constant and defined by the height H at which the RSU 20 is mounted. By way of example, in the simplest case, the height of the RSU 20 relative to the height of the OBU 10 is taken to be height H as shown here. However, elements such as the mounting height of the OBU 10 in the vehicle may also be taken into account, for example, by subtracting this mounting height from height H in order to obtain the height of the RSU 20 relative to the height of the OBU 10.

In this case, the planar distances $D_{P,0}$, $D_{P,1}$, $D_{P,2}$ for each of positions $P_0$, $P_1$, $P_2$ can be readily calculated based on the height H and the direct distances $D_{L2,0}$, $D_{L2,1}$, $D_{L2,2}$ using, for example, Pythagoras theorem:

$$D_P = \sqrt{D_{L2}^2 - H^2} \quad (1)$$

However, the present inventors have recognised that a problem may arise if the road is situated in a hilly area or, more generally, in cases in which the terrain on which the vehicle is travelling is not ideally flat.

Figure 2A:
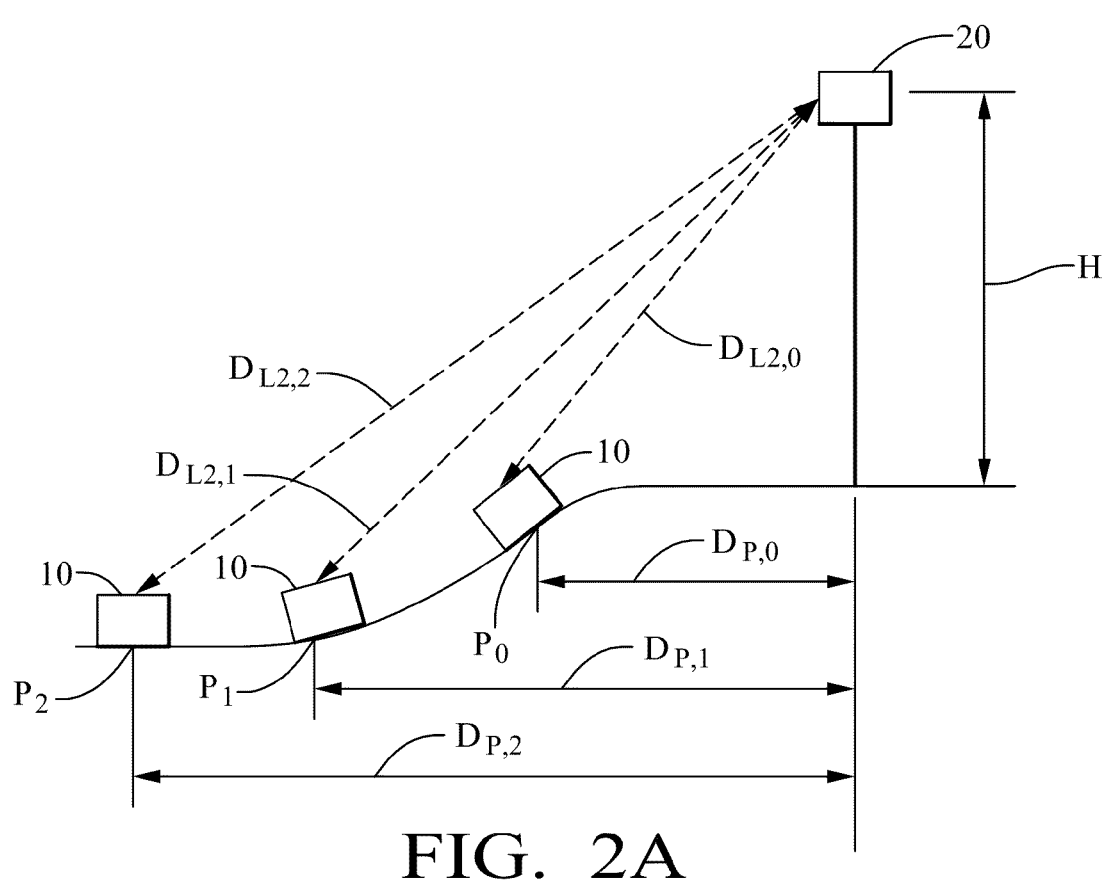
FIGS. 2A and 2B are schematic illustrations showing the relationship between direct distance, planar distance, and height in non-ideal cases.
Figure 2B:
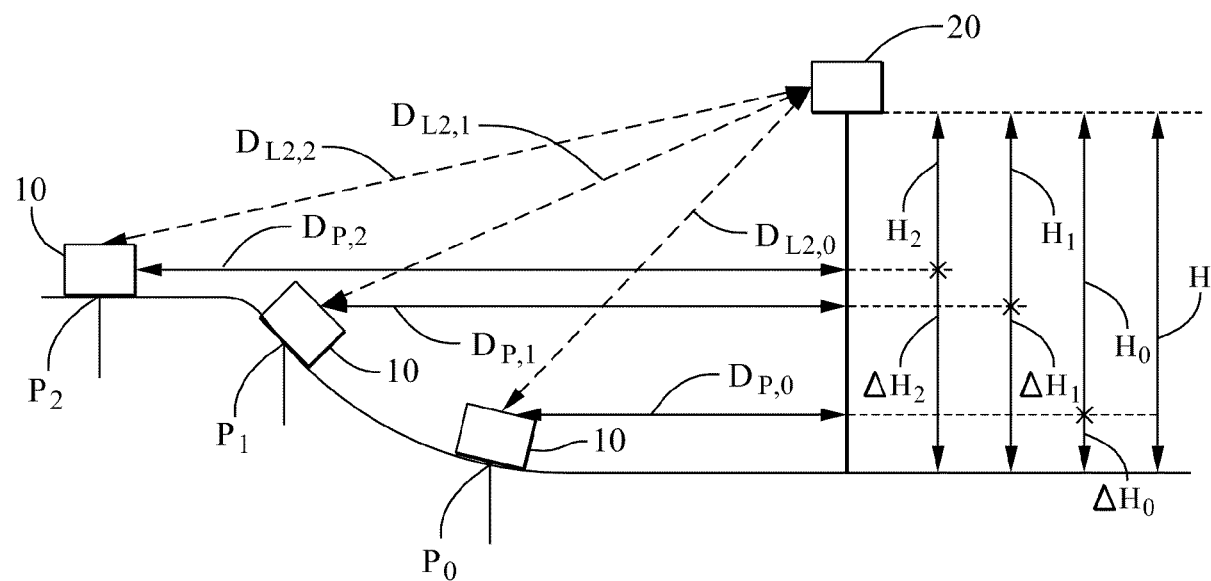

FIGS. 2A and 2B are schematic illustrations showing the relationship between direct distance $D_{L2,i}$, planar distance $D_{P,i}$, and height H in non-ideal cases.

In particular, in the example of FIG. 2A, a non-ideal case occurs as the surface on which the vehicle is travelling is not flat and the light pole or other infrastructure element on which the RSU 20 is mounted, is located on elevated ground relative to at least part of the road on which the vehicle is travelling. In the example of FIG. 2B, a non-ideal case occurs as the surface on which the vehicle is travelling is not flat and the light pole or other infrastructure element on which the RSU 20 is mounted, is located on lower ground relative to at least part of the road on which the vehicle is travelling.

In this case, the height H of the RSU 20 above the ground (i.e., the height at which it is mounted) at the position of the light pole or other infrastructure element and the height of the RSU 20 from the vehicle's perspective may differ significantly.

As such, as shown in FIGS. 2A and 2B, information about the height H at which the RSU 20 is mounted would not be sufficient to allow the planar distances $D_{P,0}$, $D_{P,1}$, $D_{P,2}$ for each of positions $P_0$, $P_1$, $P_2$ to be derived from the corresponding direct distance $D_{L2,0}$, $D_{L2,1}$, $D_{L2,2}$. More specifically, if the vehicle at a particular moment in time is situated on the slightly elevated level with respect to the light pole which is situated lower in space, then the real height of the RSU 20 above the level where the vehicle is situated is lower than the height H at which the RSU 20 is mounted. Conversely, when the vehicle is situated on the slightly depressed level with respect to the mounting position of the light pole on the ground, then the real height of the RSU 20 from the vehicle's point of view will be higher than the height H.

Depending on the differences of these height levels, the aforementioned situations may introduce significant errors in the determination of planar distance. This, in turn, may affect the vehicle's ability to position itself and the RSU in its high-level environment model and, thus, introduce significant errors in the intermediate positions of the vehicle with respect to particular lanes on the road.

Similar problems may arise in a non-ideal case in which the road, on which the vehicle in which the OBU 10 is mounted travels, is curved and not ideally straight. In this case, the light pole or other infrastructure element on which the RSU 20 is mounted is visible at a specified angle α (azimuth).

Therefore, the present inventors have developed various techniques, based on V2I technology, that aim to improve the precision of vehicle location estimation on a road in a case where the road is bendy and/or situated in a hilly area. Example embodiments described in the following may address one or more of the issues outlined above, and will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

Figure 3:
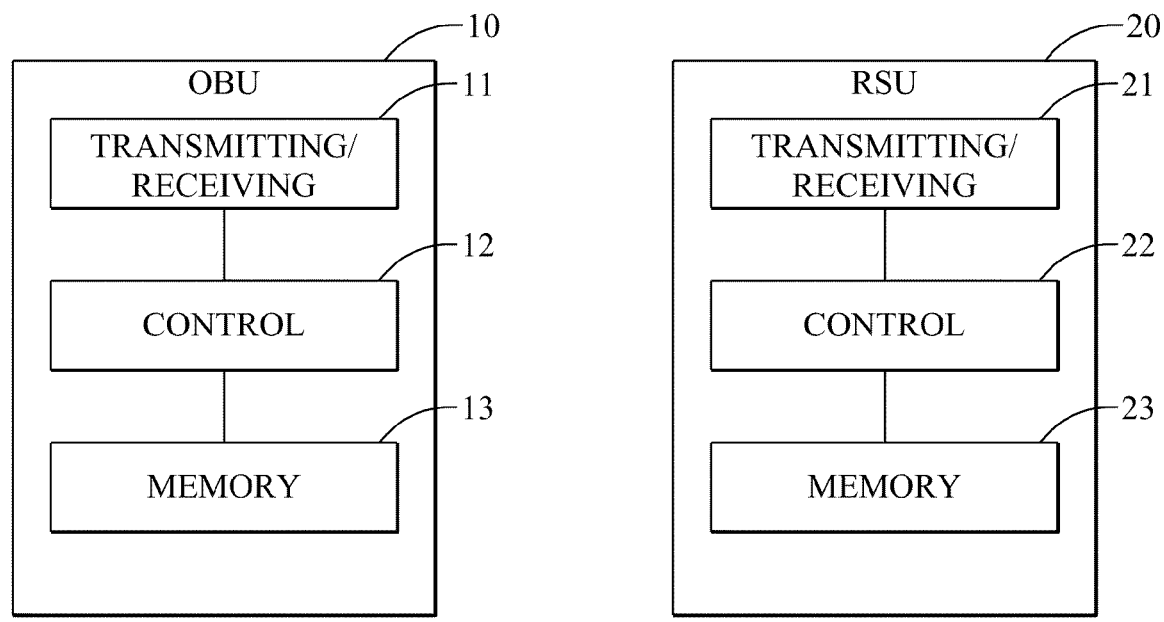
FIG. 3 is a schematic illustration of an OBU and an RSU, according to an example embodiment herein.

FIG. 3 is a schematic illustration of an OBU 10 and an RSU 20, according to an example embodiment herein.

As shown in FIG. 3, the onboard unit 10 (OBU 10) comprises a transmitting/receiving section 11, a control section 12, and a memory section 13. The control section 12 is configured to control the onboard unit 10 to perform various methods in accordance with the example embodiments described herein.

Similarly, as shown in FIG. 3, the roadside unit 20 (RSU 20) comprises a transmitting/receiving section 21, a control section 22, and a memory section 23. The control section 22 is configured to control the roadside unit to perform various methods in accordance with the example embodiments described herein.

Both of OBU 10 and RSU 20 may be considered as V2I communication devices or transponders. As such, transmitting/receiving section 11 may comprise any means necessary to enable the OBU 10 to perform V2I communication with RSUs, such as RSU 20, and, optionally, other vehicles and/or objects within its communication range according to any suitable V2I communication standard known in the art. Similarly, transmitting/receiving section 21 may comprise any means necessary to enable the RSU 20 to perform V2I communication with OBUs, such as OBU 10, and, optionally, other RSUs and/or objects within its communication range according to any suitable V2I communication standard known in the art.

By way of example, each of transmitting/receiving sections 11 and 21 may, as in the present example embodiment, perform communication in accordance with Impulse-Radio Ultrawideband technology (IR-UWB). By way of alternative, each of transmitting/receiving sections 11 and 21 may perform communication in accordance with cellular-based V2I technology, WLAN-based V2I technology (e.g., Dedicated Short Range Communication, DSRC), etc.

Additionally, the transmitting/receiving section 11 of the OBU may, as in the present example embodiment, comprise one or more interfaces or any other means necessary to communicate with a vehicle in which it is mounted, including exchanging information with other modules of the vehicle (e.g., receiving data from other measurement devices provided in the vehicle or providing information to one or more modules responsible from autonomous control of the vehicle).

In some example embodiments, the OBU 10 and/or the RSU 20 may comprise any sensors or other suitable means known in the art for collecting data about the vehicle and its environment. By way of example, one or both of the OBU 10 and the RSU 20 may comprise one or more of temperature sensors, humidity sensors, ambient light sensors, cameras, etc. In such example embodiments, control sections 12 and 22 may be appropriately adapted to control sensors or other means, including control to perform measurements, control to process the measurement results, control to store the processed measurement results in memory sections 13 and 23, respectively, and/or control to transmit these to another entity.

As will be discussed in further detail below, the memory section 23 of the RSU 20 may be configured to store a height correction function and/or a curvature correction function determined in accordance with example embodiments herein. Techniques for determining height correction functions and/or curvature correction functions in accordance with example embodiments herein are discussed in detail below.

Additionally or alternatively, the control section 12 of OBU 13 may, as in the present example embodiment, be configured, on its own or together with other modules of the vehicle in which it is mounted, to collect data about the vehicle and its environment and to generate a high-level environment model describing the road on which the vehicle is travelling and the traffic on it. Alternatively, the transmitting/receiving section 11 may be configured to receive an environment model from another entity (e.g., within the vehicle). In such example embodiments, the memory section 13 of the OBU 10 may be configured to store the generated high-level environment model. Alternatively, such a high-level environment model may be stored in another memory section of the vehicle, e.g., a memory section used to support ADAS functionality, and the OBU 10 may be configured to access the model or parts thereof as necessary.

Similarly, the memory section 23 of the RSU 20 may be configured to store an environment model, as described above, or a part thereof relating to an area in the vicinity of the RSU 20. By way of example, the RSU 20 may be configured to generate such an environment module or to receive such an environment model from another entity.

Such an environment model may be defined by any suitable means, such as, for example, a global coordinate system (GCS), a lane coordinate system (LCS) or a grid model or any other suitable means such that the position of the OBU 10 relative to other objects (e.g., boundaries of the road and lanes, other vehicles, RSUs, etc.) may be defined over time and as the position of vehicles changes.

By way of example, the environment model may be defined in an LCS. The LCS may be a two-dimensional curvilinear coordinate system adapted to reflect a road on which the model is based. In particular, a curvilinear coordinate system constituting the LCS may have two axes, namely a longitudinal axis or x-axis, which extends in a longitudinal direction along the road, and a lateral axis or y-axis, which extends across the road. The x-axis is always parallel to the lanes of the road and the y-axis is orthogonal to the x-axis at every value of x. The x-axis of the LCS may be defined to increase in the direction of forward travel of the vehicle and the y-axis of the LCS to increasing in the direction of the left-most lane of the road 20. However, the LCS may be orientated in any other suitable way. The LCS and thus the model may, however, be defined in other ways, for example using a Cartesian coordinate system.

Objects may be defined in the environment model in any suitable way for the coordinate system used, e.g., as a (programming) object having dynamic properties or by one or more cells of a grid having dynamic properties. Distances between various objects in the environment model may be determined based on the lateral and longitudinal positions of said objects in the environment model. The lateral and longitudinal positions of objects in the environment model may, for example, be defined with respect to a centre of a bounding box of the object or in relation to any other predefined reference point of the object such as, for example, a predetermined corner of the bounding box, a centre of mass or a centroid of the object, etc.

Figure 4:
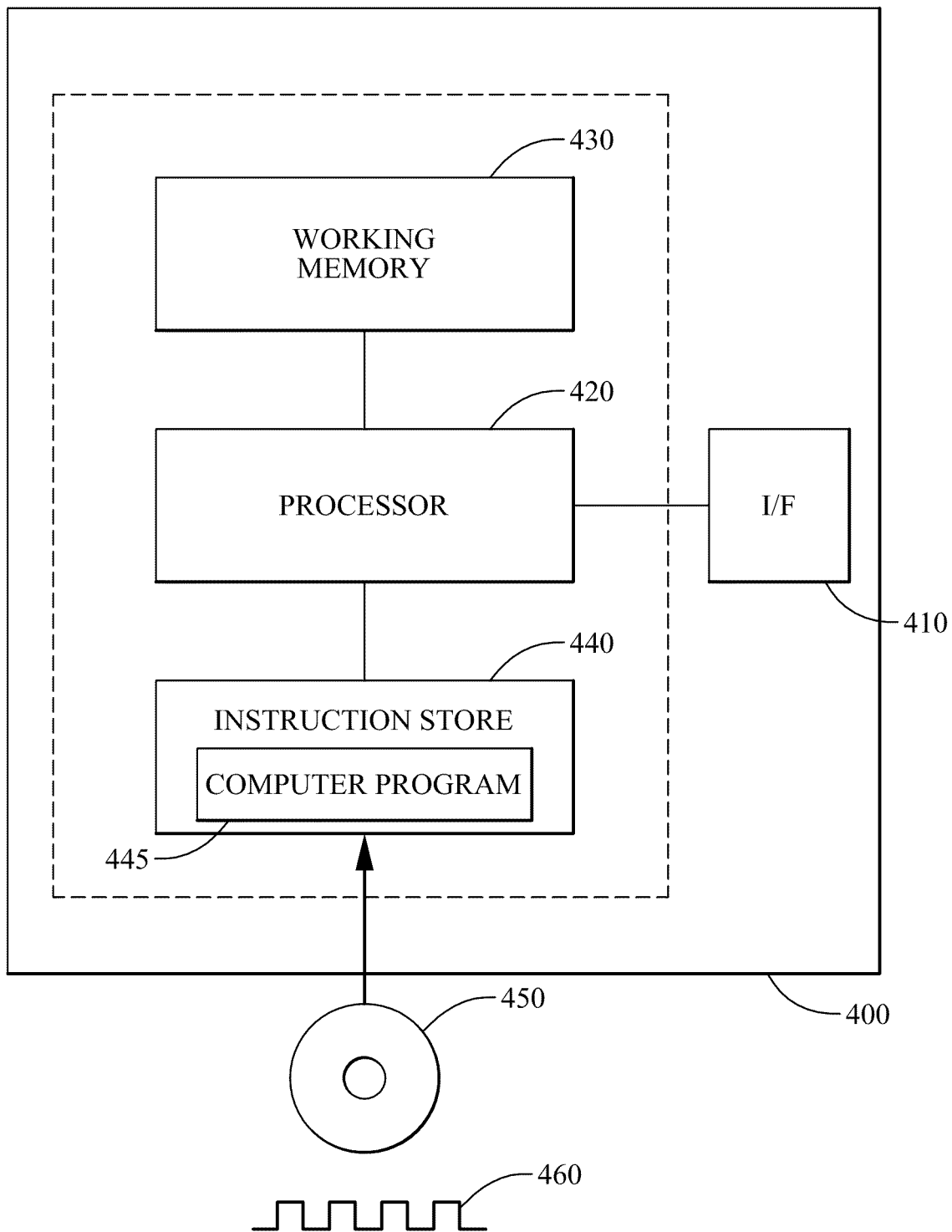
FIG. 4 is a block diagram illustrating an example implementation of the OBU or RSU of the example embodiment in programmable signal processing hardware.

FIG. 4 is a schematic illustration of programmable signal processing apparatus 400, which may be configured to implement the functionality of the OBU 10 or the RSU 20 of FIG. 3.

The signal processing apparatus 400 has an interface module 410 providing means (e.g., one or more antennae or wired connections) for transmitting and receiving information. The signal processing apparatus 400 also has a processor 420 (e.g., a CPU) for controlling the programmable signal processing apparatus 400 to perform the functions of the OBU 10 or the RSU 20, a working memory 430 (e.g., a random-access memory) and an instruction store 440 storing a computer program 445 having computer-readable instructions which, when executed by the processor 420, cause the processor 420 to perform the functions of the OBU 10 or the RSU 20.

The instruction store 440 may include a ROM (e.g., in the form of an electrically-erasable programmable read-only memory (EEPROM) or flash memory) which is pre-loaded with the computer-readable instructions. Alternatively, the instruction store 440 may include a RAM or similar type of memory, and the computer-readable instructions can be input thereto from a computer program product, such as a computer-readable storage medium 450 such as a CD-ROM, etc. or a computer-readable signal 460 carrying the computer-readable instructions.

The programmable signal processing hardware 400 of FIG. 4 may, as in the present example embodiment, be configured to function as an OBU 10 or an RSU 20. However, each of the OBU 10 and the RSU 20 may alternatively be implemented in non-programmable hardware, such as an application-specific integrated circuit (ASIC) or in any other suitable manner, using any suitable combination of hardware and software components.

The present inventors have developed various techniques, based on V2I technology, that aim to improve the precision of vehicle location estimation on a road in a case where the road is bendy and/or situated in a hilly area. In particular, the present inventors have devised techniques for determining height correction functions and/or curvature correction functions and storing the functions for individual RSUs, in accordance with example embodiments herein.

Once a height correction function and/or curvature correction function have been determined and stored for a particular RSU (e.g., RSU 20 shown in FIG. 3), the height correction function and/or curvature correction function may be used to compensate for the unevenness of the terrain or the curvature of the road in the vicinity of that RSU when determining a planar distance between that RSU and an OBU (e.g., OBU 10 shown in FIG. 3).

Figure 5:
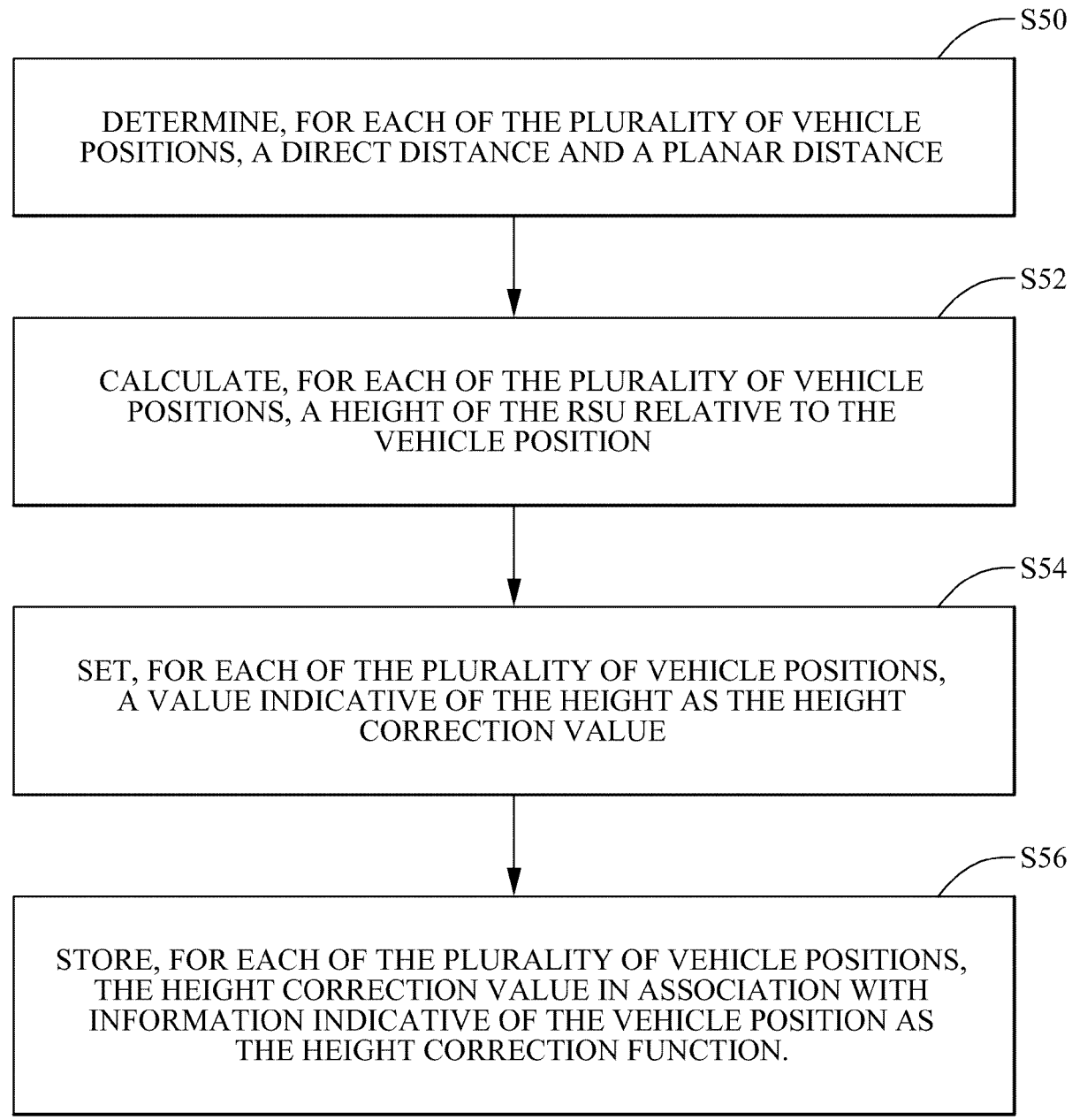
FIG. 5 is a flow diagram illustrating a process by which a height correction function associating each of a plurality of vehicle positions to a respective height correction value may be determined, in accordance with an example embodiment herein.

FIG. 5 is a flow diagram illustrating a process by which a height correction function associating each of a plurality of vehicle positions $P_i$ to a respective height correction value may be determined.

The process of FIG. 5 may, for example, be carried out once for a given road section to which a V2I system is applied, e.g., before putting the road into use, or after installing the RSU device system on a given road section. Additionally or alternatively, the process of FIG. 5 may be repeated periodically, e.g., after significant roadworks or repairs on that section of road, etc.

By way of example, the process of FIG. 5 may be computer-implemented. In particular, the process of FIG. 5 may, as in the present example embodiment, be implemented by computing means provided with means suitable from measuring direct and planar distances, distance travelled between positions at which the vehicle is situated at consecutive moments in time, changes in elevation level between the positions at which the vehicle is situated at consecutive moments in time, etc. Alternatively, the process of FIG. 5 may be implemented by computing means configured to obtain previously acquired measurements, e.g., over a network or from a memory.

By way of specific example, the process of FIG. 5 may, for example, be implemented by a specialised vehicle equipped with appropriately programmed computing means and precise measurement devices that facilitate measurement of the following values:

Direct Euclidean distance $D_{L2,i}$ to an infrastructure element on which the RSU is mounted and the corresponding planar distance $D_{P,i}$;
Travelled distance $L_i$ between vehicle positions $P_i$; and
Elevation level difference $\Delta h_i$ between the vehicle positions $P_i$.

The plurality of vehicle positions $P_i$ are within a predetermined region defined relative to a roadside unit (e.g., RSU 20 shown in FIG. 3).

By way of example, the predetermined region may, as in the present example embodiment, be defined based on the communication range of the RSU 20 such that the RSU 20 may reliably perform V2I communication with an OBU (e.g., OBU 10 shown in FIG. 3) located at any of the plurality of vehicle positions $P_i$. Alternatively, the predetermined region may be defined by any suitable means, e.g., as all positions for which the RSU is the closest RSU to that position in cases where a network of V2I transponders is used.

Additionally or alternatively, the plurality of vehicle positions $P_i$ may comprise a sequence of positions defining a trajectory of a vehicle along a road within the predetermined region. As roads generally consist of at least one lane for which a direction of travel is defined, each of the plurality of vehicle positions $P_i$ may have an associated direction of travel. For each vehicle position Pi, this associated direction of travel may be the direction in which the vehicle must move in order to reach the next position in the trajectory.

The plurality of vehicle positions $P_i$ may be defined at any suitable level of granularity and may be irregularly spaced. In example embodiments such as the present example embodiment in which the plurality of vehicle positions $P_i$ may comprise a sequence of positions defining a trajectory, each pair of consecutive vehicle positions $P_i$ should be sufficiently close together so that the vehicle may be safely controlled to move directly from one vehicle position $P_i$ to the while maintaining a safe position with respect to road and lane boundaries.

In process step S50 of FIG. 5, it is determined, for each of the plurality of vehicle positions $P_i$:
a direct distance $D_{L2,i}$ between the vehicle position $P_i$ and a position of the roadside unit 20; and
a planar distance $D_{P,i}$ between the vehicle position $P_i$ in a horizontal plane containing the vehicle position $P_i$, and a projection of the position of the roadside unit 20 onto the plane.

The direct distance may, as in the present example embodiment, be a direct Euclidean distance (denoted as L2) as measured using a laser rangefinder, a time-of-flight sensor, or any other suitable measurement device. As such, the vehicle position $P_i$ may be approximated as the position of the measurement device. Alternatively, if the measurement device is mounted at a known position on, for example, a specialised vehicle, a direct distance may be obtained by adjusting a measured distance based on the known mounting position so that the direct distance corresponds to the distance that would have been measured had the measuring device been located precisely at the vehicle position $P_i$. Similarly, the position of the RSU 20 may be defined in any way suitable from the purposes of the measurement, e.g., a nearest point of the RSU 20, a centre point of a particular surface of the RSU 20, etc.

The term horizontal has its conventional meaning in the present disclosure, namely describing a plane or direction that is perpendicular to a direction containing the local gravity direction at that point (i.e., the vertical direction). As shown in FIGS. 2A and 2B, a horizontal plane may be defined for each point, namely vehicle positions $P_0$, $P_1$, $P_2$, representing a position of the vehicle on which an OBU is mounted at a particular moment in time so as to contain the longitudinal and lateral directions with respect to the host vehicle.

The projection of the position of the roadside unit 20 onto the plane may be achieved by any suitable means. By way of example, as shown in FIG. 2B, where the elevation level of a particular vehicle position (e.g., $P_0$) overlaps in the vertical direction with the light pole or other infrastructure element on which the RSU 20 is mounted such that the position of the light pole or other infrastructure element is contained in the plane, the position of the RSU 20 may simply be defined as the position of the light pole or other infrastructure element in the plane. Alternatively, as shown in FIG. 2A, where the elevation level of a particular vehicle position (e.g., $P_2$) does not overlap in the vertical direction with the RSU or the light pole (or other infrastructure element) on which the RSU 20 is mounted such that neither the position of the RSU 20 nor the position of the light pole (or other infrastructure element) is contained in the plane, the position of the RSU 20 may be projected in a vertical direction onto the plane.

By way of more detailed example, FIGS. 6A and 7A each show a graph of the direct distances $D_{L2}$ and the planar distance $D_P$ for an example of 5-metre elevation level difference, for a case in which the vehicle position is on an elevated level with respect to the position of the infrastructure element on which the RSU 20 is mounted and a case in which the vehicle position is on a depressed level with respect to the position of the infrastructure element on which the RSU 20 is mounted, respectively.

In some example embodiments, such as the present example embodiment, the mounting height of each measurement device may be determined and stored, for example, in the RSU 20 in association with the height correction function. In such example embodiments, the RSU 20 may use or provide to the OBU 10 information indicative of the mounting height of each measurement device. This information may be used to appropriately adjust the height correction values obtained using the stored height correction function, as will be discussed in further detail below.

In process step S52 of FIG. 5, it is calculated, for each of the plurality of vehicle positions $P_i$, a height $H_i$ (shown in FIG. 2B) of the roadside unit relative to the vehicle position $P_i$ using the direct distance $D_{L2,i}$ and the planar distance $D_{P,i}$ determined for the vehicle position $P_i$.

By way of example, the height $H_i$ of the roadside unit relative to the vehicle position $P_i$ may be calculated using Pythagoras theorem as:

$$H_i = \sqrt{D_{L2,i}^2 - D_{P,i}^2} \qquad (2)$$

Alternatively, the height $H_i$ of the roadside unit relative to the vehicle position $P_i$ may be calculated using any other suitable trigonometric functions known in the art.

As shown in FIG. 2B, the height $H_i$ of the roadside unit relative to the vehicle position takes into account both the difference in height (elevation) between the vehicle position $P_i$ in question and the position of the light pole or other infrastructure element on which the RSU 20 is mounted, as well as the height H above ground level at which the RSU 20 is mounted.

In process step S54 of FIG. 5, it is set, for each of the plurality of vehicle positions $P_i$, a value indicative of the height $H_i$ of the roadside unit relative to the vehicle position as a height correction value.

By way of example, the value indicative of the height $H_i$ of the RSU 20 relative to the vehicle position $P_i$ may, as in the present example embodiment, be the height $H_i$ calculated in process step S52.

Alternatively, in example embodiments such as that shown in FIG. 2B, in which the RSU 20 is positioned at a predetermined height H relative to ground level, the process of FIG. 5 may further comprise calculating for each of the plurality of vehicle positions $P_i$, a difference $\Delta H_i$ between the height $H_i$ of the roadside unit relative to the vehicle position and the predetermined height H.

For each of the plurality of vehicle positions $P_i$, the value indicative of the height $H_i$ of the roadside unit relative to the vehicle position $P_i$ may then be set as the difference $\Delta H_i$ calculated for the vehicle position. This may allow the volume of data to be stored as part of the height correction function to be reduced because the difference $\Delta H_i$ will generally be smaller (requiring fewer bits to express) than the height $H_i$.

By way of more detailed example, difference $\Delta H_i$ between the height $H_i$ of the roadside unit relative to the vehicle position and the predetermined height H, i.e., the difference between the real height on the infrastructure element at which the RSU 20 is mounted and the height measured from the vehicle's perspective, can be calculated using the following formula below:

$$\Delta H_i = H - H_i = H - \sqrt{D_{L2,i}^2 - D_{P,i}^2} \qquad (3)$$

By way of further alternative, the value indicative of the height $H_i$ of the roadside unit relative to the vehicle position $P_i$ may have any suitable form, for example, an index indicating a specific value among a set of values to which the actual height $H_i$ is closest in value (i.e., the value represents a quantised version of $H_i$) or height range into which $H_i$ falls (for example, the height correction value may be expressed at a predetermined degree of resolution, which may be represented by index, e.g., 0 = a relative height of 1.0 to 1.5 m, 1 = a relative height of 1.5 to 2.0 m, etc.), a factor by which a set value (e.g., H) is multiplied to give $H_i$, etc.

In process step S56 of FIG. 5, it is stored, in the roadside unit, for each of the plurality of vehicle positions, the height correction value of the vehicle position $P_i$ in association with information indicative of the vehicle position $P_i$ as the height correction function.

By way of example, for each of the plurality of vehicle positions $P_i$, the information indicative of the vehicle position may be the direct distance $D_{L2,i}$ between the vehicle position $P_i$ and the roadside unit 20.

By way of alternative, the information indicative of the vehicle position $P_i$ may have any suitable form that allows the information to be used as a key to identify an appropriate height correction value for that vehicle position $P_i$ based on the height correction function. For example, the information indicative of the vehicle position $P_i$ may be an index indicating a specific direct distance $D_{L2,i}$ or a range of direct distances, a factor by which a set value is multiplied to give the direct distance $D_{L2,i}$, coordinates indicating the vehicle position $P_i$ in a high-level environment model defined by a global coordinate system, LCS or other coordinate system, etc.

The height correction function may, as in the present example embodiment, be stored in the roadside unit in the form of a look-up table (LUT). For example, the LUT may represent a simple and convenient means of associating information indicative of each vehicle position $P_i$ with a respective height correction value such that, for a known vehicle position $P_i$, the corresponding height correction value may be readily identified.

By way of more detailed example, FIGS. 6B and 7B are diagrams showing the height correction function ΔH sampled over the measured direct (Euclidean) distance domain ($D_{L2}$). This graph is an illustration of an LUT as described above.

FIGS. 6C and 7C are diagrams showing the correction function ΔH sampled over the planar distance domain ($D_P$). This information may also be part of the LUT, stored with values shown in the diagrams of FIGS. 6B and 7B, respectively.

Alternatively, height correction function may be stored in the roadside unit in any other suitable form, e.g., as a mathematical function or a polynomial describing the shape of the road altitude profile, an indexed list in which each index corresponds to a height correction value and each increment of the index indicates a known step-size of distance from the RSU 20, etc. For example, a vertical "shape" of the road section may be determined and expressed in a mathematical form (a polynomial - a function of distance to RSU).

Accordingly, the process of FIG. 5 allows a height correction function to be determined and stored for a particular RSU (e.g., RSU 20 shown in FIG. 3). The determined height correction function may be used to compensate for the unevenness of the terrain in the vicinity of that RSU when determining a planar distance between that RSU and an OBU (e.g., OBU 10 shown in FIG. 3) such that the planar distance may be determined more accurately.

In the examples of FIGS. 2A and 2B and the more detailed examples of FIGS. 6D, 6E, 7D, and 7E, the terrain in the vicinity of the RSU 20 results in the height correction function being a monotone function.

This is clearly illustrated in FIGS. 6D and 6E and FIGS. 7D and 7E. FIGS. 6D and 7D are diagrams showing how the direct distance $D_{L2}$ changes over the planar domain (i.e., over the range of planar distance $D_P$). FIGS. 6E and 7E are diagrams showing how the direct distance $D_{L2}$ changes between two adjacent positions, in which the planar distance $D_P$ is measured. As can clearly be seen from the diagrams of FIGS. 6E and 7E the changes $\Delta D_{L2}$ in the measured direct distance $D_{L2}$ all have the same sign such that the height correction function is a monotone function.

However, it is possible to find situations in which such monotonicity is not maintained within the predetermined region defined relative to RSU 20. This may occur, for example, where there are one or more unusually steep slopes in the vicinity of the RSU 20 that may result in multiple vehicle positions at different planar distances from the RSU 20 having the same measured direct distance.

FIGS. 8A, 8B, 8C, 8D, and 8E illustrate an exaggerated, but mathematically possible, case in which monotonicity is not maintained at a short distance from the RSU 20.

FIG. 8A shows a graph of the direct distances $D_{L2,i}$ and the planar distance $D_{P,i}$ for an example of 5-metre elevation level difference. FIG. 8B shows a diagram showing the height correction function ΔH sampled over the measured direct (Euclidean) distance domain ($D_{L2}$). This graph is an illustration of an LUT as described above. FIG. 8C is a diagram showing the correction function ΔH sampled over the planar distance domain ($D_P$). This information may also be part of the LUT, stored with values shown in the diagram of FIG. 8B FIG. 8D is a diagram showing how the direct distance $D_{L2}$ changes over the planar domain (i.e., over the range of planar distance $D_P$) and FIG. 8E is a diagram showing how the direct distance $D_{L2}$ changes between two adjacent positions, in which the planar distance $D_P$ measurements are performed. As can clearly be seen from the diagram of FIG. 8E the changes $\Delta D_{L2}$ in the measured direct distance $D_{L2}$ do not have the same sign such that the height correction function is not monotone at a short distance from the RSU 20.

In such case, there is a risk that, if the information indicative of a given vehicle position $P_i$ is based on the direct distance $D_{L2,i}$ measured for that vehicle position $P_i$, a small number of vehicle positions $P_i$ may share the same information such that the height correction function will associate multiple height correction values with each of these vehicle positions $P_i$. As such, it may not be possible to determine an appropriate height correction value for an individual vehicle position.

Accordingly, in some example embodiments, the process of FIG. 5 may further include storing in the roadside unit, for each of the plurality of vehicle positions, information indicative of the planar distance $D_{P,i}$ in association with the associated height correction value and information indicative of the vehicle position $P_i$ as part of the height correction function. Using the planar distance $D_{p,i}$, it is possible to determine in which area of the LUT the solution should be looked for. For example, where a more accurate planar distance is not yet available, a planar distance calculated based on height H alone may be used to estimate the area in which the relevant height correction value is likely to be found.

As such, it may be possible to reduce or avoid the risk of an inappropriate height correction value will be provided for a given vehicle position $P_i$, even in cases where there are one or more unusually steep slopes in the vicinity of the RSU 20.

Another potential issue may arise where the RSU 20 is mounted at a relatively large height H and the planar distance $D_{P,i}$ between the vehicle positions $P_i$ and the RSU 20 is relatively small. In this case, the direct distance $D_{L2}$ changes to a relatively small extent for relatively large changes in planar distance $D_P$. As such, there may be a risk that the resolution of the height correction function is not sufficient to capture the relatively large changes in planar distance $D_P$. There are two solutions to resolve this problem.

Firstly, the step with which the height correction function is stored in the memory section 23 of the RSU 20 may be non-uniform and a smaller step size may be used for smaller values of $D_{L2,i}$. This may be achieved by performing the process of FIG. 5 such that these is a higher density of vehicle positions closer to the position of the RSU 20.

Alternatively, the RSU 20 may be configured not to provide a height correction value to an OBU 10 or to otherwise prevent the OBU from using the RSU 20 as a source of information when a ratio of $D_{L2,i}$:H is below a certain threshold. It is envisaged that, in the application of V2I technology to ADAS and autonomous driving, that networks of V2I transponders may be provided such that multiple RSUs may potentially be in the field of view of the vehicle on which OBU 10 is mounted. Therefore, a given vehicle has the ability to use many other RSUs in a given area, so the unavailability of a single RSU may not be significant.

Figure 9:
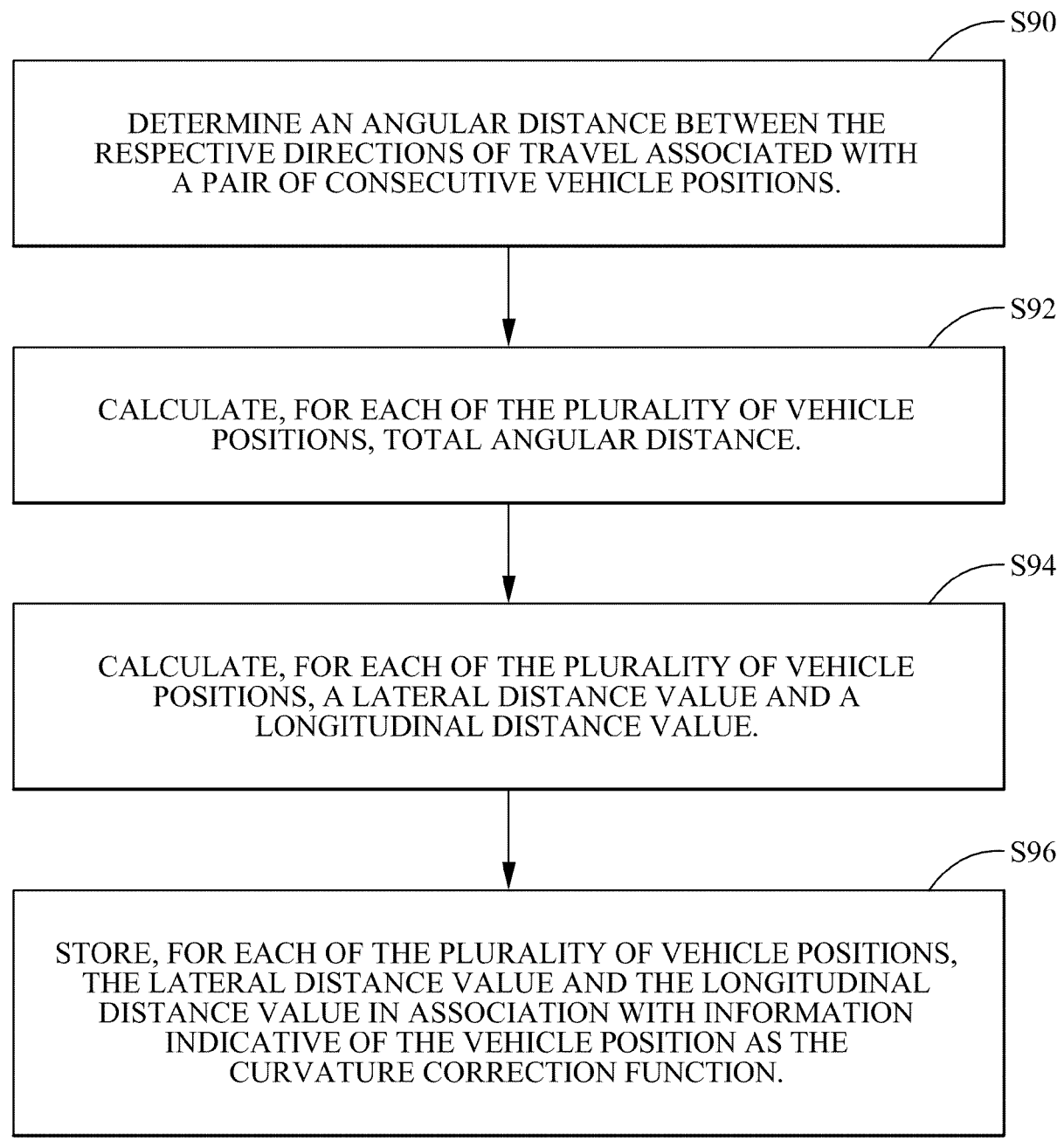
FIG. 9 is a flow diagram illustrating a process by which a curvature correction function associating each of a plurality of vehicle positions to a respective lateral distance value and a respective longitudinal distance value may be determined, in accordance with an example embodiment herein.

FIG. 9 is a flow diagram illustrating a process by which a curvature correction function associating each of a plurality of vehicle positions $P_i$ to a respective lateral distance value $\Delta Y_i$ and a respective longitudinal distance $\Delta X_i$ value may be determined.

The process of FIG. 9 may, for example, be carried out once for a given road section to which a V2I system is applied, e.g., before putting the road into use, or after installing the RSU device system on a given road section. Additionally or alternatively, the process of FIG. 9 may be repeated periodically, e.g., after significant roadworks or repairs on that section of road, etc.

The plurality of vehicle positions $P_i$ are within a predetermined region defined relative to an RSU 20(e.g., RSU 20 shown in FIG. 3) and comprise a sequence of positions defining a trajectory of a vehicle along a road, each of the plurality of vehicle positions having an associated direction of travel. The description of these aspects in relation to the process of FIG. 5 applies equally to the process of FIG. 9.

The process of FIG. 9 may be computer-implemented. In particular, the process of FIG. 5 may, as in the present example embodiment, be implemented by computing means provided with means suitable from measuring direct and planar distances, distance travelled between positions at which the vehicle is situated at consecutive moments in time, changes in elevation level between the positions at which the vehicle is situated at consecutive moments in time, angular difference between directions of travel in two consecutive positions, etc. Alternatively, the process of FIG. 9 may be implemented by computing means configured to obtain previously acquired measurements, e.g., over a network or from a memory.

By way of specific example, the process of FIG. 9 may, for example, be implemented by a specialised vehicle equipped with appropriately programmed computing means and precise measurement devices that facilitate measurement of the following values:

Direct Euclidean distance $D_{L2,i}$ to an infrastructure element on which the RSU is mounted and the corresponding planar distance $D_{P,i}$;

Travelled distance $L_i$ between vehicle positions $P_i$;

Elevation level difference $\Delta h_i$ between the vehicle positions $P_i$; and Angular difference $\Delta \alpha_i$ between the travel directions in two consecutive vehicle positions $P_i$.

In process step S90 of FIG. 9, it is determined, for each pair of consecutive vehicle positions among the plurality of vehicle positions $P_i$, an angular distance $\Delta \alpha_i$ between the respective directions of travel $\alpha_i$ associated with the pair of consecutive vehicle positions.

The angular distance $\Delta \alpha_i$ between the respective directions of travel $\alpha_i$ associated with the pair of consecutive vehicle positions may, for example, be measured using suitable onboard sensors (yaw rate, velocity etc.).

The angular distance $\Delta \alpha_i$, i.e., the change of travel directions between two consecutive vehicle positions $P_i$ and $P_{i-1}$, may be calculated using the formula:

$$\Delta \alpha_i = \alpha_i - \alpha_{i-1} \quad (4)$$

Figure 10:
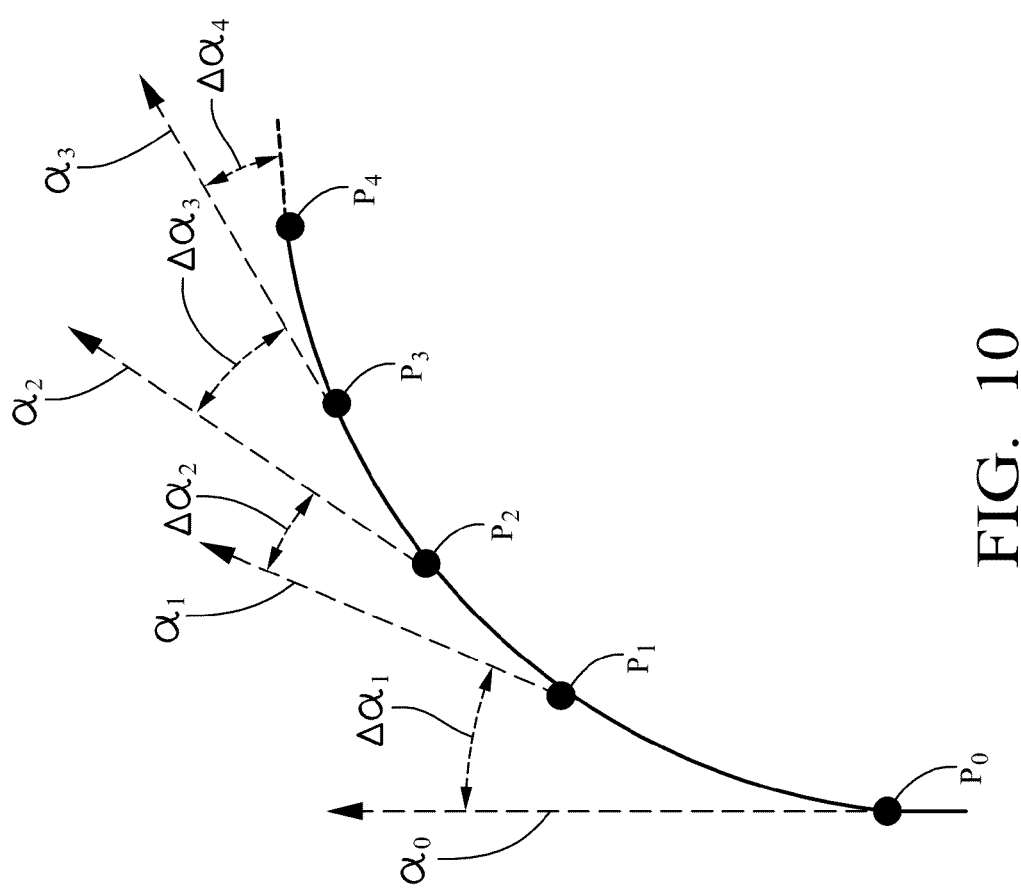
FIG. 10 is a schematic illustration of a portion of a trajectory comprising five vehicle positions, each having an associated direction of travel.

By way of example, FIG. 10 is a schematic illustration of a portion of a trajectory comprising five vehicle positions $P_0$ to $P_4$, each having an associated direction of travel $\alpha_0$ to $\alpha_4$, respectively.

In process step S92 of FIG. 9, it is calculated, for each of the plurality of vehicle positions $P_i$, a total angular distance $\beta_i$ between the direction of travel associated with the vehicle position $P_i$ and a direction of travel associated with a vehicle position closest to a position of the roadside unit 20.

By way of example, in the example of FIG. 10, $P_0$ may be the vehicle position closest to a position of the RSU 20. As such, at vehicle position $P_0$, the total angular distance $\beta_i$ calculated for vehicle position $P_0$ may be zero.

At vehicle position $P_1$, as vehicle position $P_0$ closest to a position of the RSU 20 and vehicle position $P_1$ are consecutive vehicle positions, the total angular distance $\beta_1$ calculated for vehicle position $P_0$ may be equal to the angular distance $\Delta \alpha_1$ between the respective directions of travel $\alpha_0$ and $\alpha_1$ associated with vehicle positions $P_0$ and $P_1$.

Similarly, at vehicle position $P_2$, the total angular distance $\beta_2$ calculated for vehicle position $P_0$ may be equal to the sum of the angular distance $\Delta \alpha_1$ between the respective directions of travel $\alpha_0$ and $\alpha_1$ associated with vehicle positions $P_0$ and $P_1$ and the angular distance $\Delta \alpha_2$ between the respective directions of travel $\alpha_1$ and $\alpha_2$ associated with vehicle positions $P_1$ and $P_2$.

More generally, the total angular distance $\beta_i$ may be calculated using the following formula:

$$\beta_k = \sum_{i=1}^{k} \Delta \alpha_i = \sum_{i=1}^{k} \alpha_i - \alpha_{i-1} \quad (5)$$

In the example of FIG. 10, for each vehicle position $P_i$, the associated direction of travel $\alpha_i$ represents the direction in which a vehicle moves to reach position $P_i$ from a previous position $P_{i-1}$.

Alternatively, the direction of travel $\alpha_i$ of vehicle position $P_i$ may be defined as representing the direction in which a vehicle must move in order to reach the next position $P_{i+1}$ in the trajectory. For example, the direction of travel $\alpha_2$ of vehicle position $P_2$ may in this alternative represent the direction in which a vehicle must move to reach position $P_3$. In such example embodiments, equations (4) and (5) above may be redefined appropriately.

In process step S94 of FIG. 9, it is calculated, for each of the plurality of vehicle positions, the lateral distance value $\Delta Y_i$ and the longitudinal distance value $\Delta X_i$ based on the total angular distance $\beta_i$ and a planar distance $D_{P,i}$ between the vehicle position $P_i$ in a horizontal plane containing the vehicle position $P_i$, and a projection of the position of the roadside unit 20 onto the plane.

The description of the planar distance $D_{P,i}$, the horizontal plane and how a position may be projected thereon in relation to the process of FIG. 5 applies equally to FIG. 9.

By way of example, using a planar distance $D_{P,i}$ such as that determined in accordance with the process of FIG. 5 for a particular vehicle position $P_i$, the lateral distance value $\Delta Y_i$ and the longitudinal distance value $\Delta X_i$ of a given vehicle position may be calculated using the following equations:

$$\Delta X_i = \cos(\beta_i) \cdot D_{P,i} \quad (6)$$

$$\Delta Y_i = \sin(\beta_i) \cdot D_{P,i} \quad (7)$$

Figure 11:
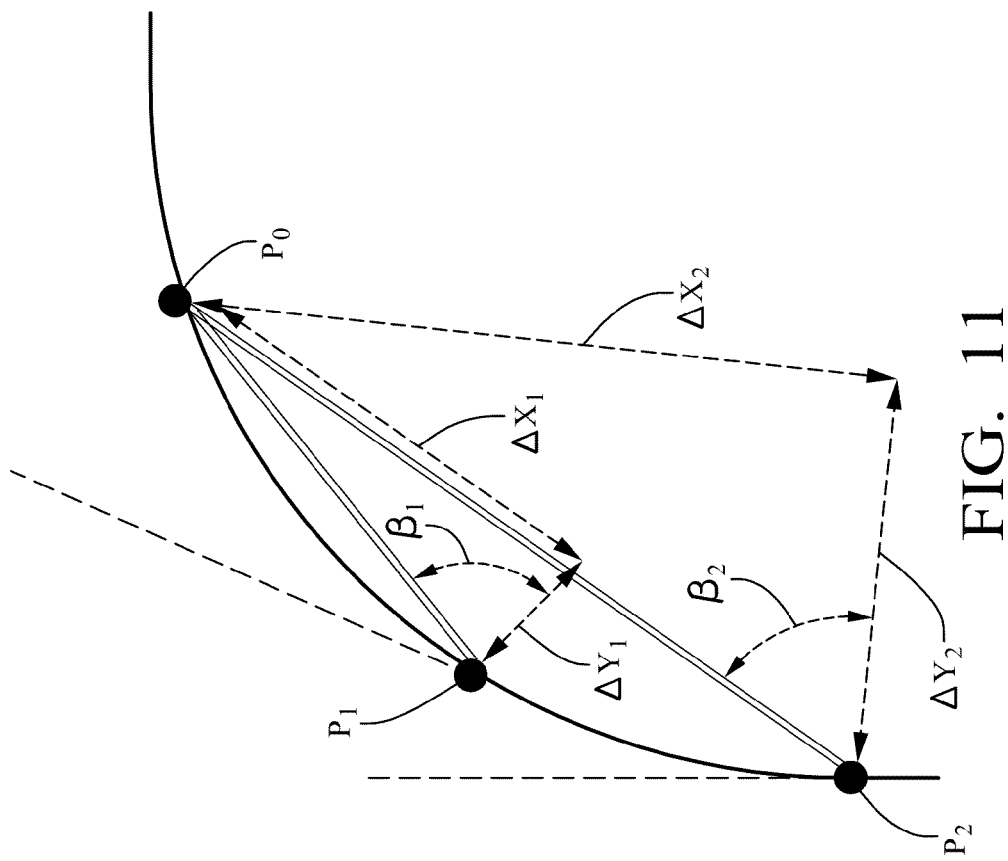
FIG. 11 is schematic illustration showing a calculated total angular distance, lateral distance value, and longitudinal distance value for two vehicle locations.

An example of a calculated total angular distance $\beta_i$, lateral distance value $\Delta Y_i$, and longitudinal distance value $\Delta X_i$ for two vehicle locations $P_1$ and $P_2$ are shown in the schematic illustration of FIG. 11.

In process step S96 of FIG. 9, it is stored in the roadside unit, for each of the plurality of vehicle positions, the lateral distance value $\Delta Y_i$ and the longitudinal distance value $\Delta X_i$ of the vehicle position $P_i$ in association with information indicative of the vehicle position $P_i$ as the curvature correction function.

The description of the information indicative of the vehicle position provided above in relation to FIG. 5 applies equally to the process of FIG. 9.

The curvature correction function may, as in the present example embodiment, be stored in the roadside unit in the form of a look-up table (LUT). For example, the LUT may represent a simple and convenient means of associating information indicative of each vehicle position $P_i$ with a respective lateral distance value $\Delta Y_i$ and longitudinal distance value $\Delta X_i$ such that, for a known vehicle position $P_i$, the corresponding lateral distance value $\Delta Y_i$ and longitudinal distance value $\Delta X_i$ may be readily identified.

Alternatively, curvature correction function may be stored in the roadside unit in any other suitable form, e.g., as a mathematical function, an indexed list in which each increment indicates a known step-size of distance from the RSU 20, etc.

Accordingly, the process of FIG. 9 allows a curvature correction function to be determined and stored for a particular RSU (e.g., RSU 20 shown in FIG. 3). The determined curvature correction function may be used to compensate for the curvature of the road in the vicinity of that RSU when determining a planar distance between that RSU and an OBU (e.g., OBU 10 shown in FIG. 3).

In particular, the curvature correction function calculated in accordance with the process of FIG. 9 may allow the relative position of the OBU 10 relative to the RSU 20 in a high-level environment model to be more accurately specified and, thus, the precision of vehicle location estimation on a road may be improved.

It will now described various techniques in which a height correction function and/or curvature correction function determined in accordance with the processes of FIGS. 5 and 9, respectively, and stored for a particular RSU (e.g., RSU 20 shown in FIG. 3), may be used to compensate for the unevenness of the terrain and/or the curvature of the road in the vicinity of that RSU 20 when determining a position of that RSU relative to an OBU (e.g., OBU 10 shown in FIG. 3).

Figure 12A:
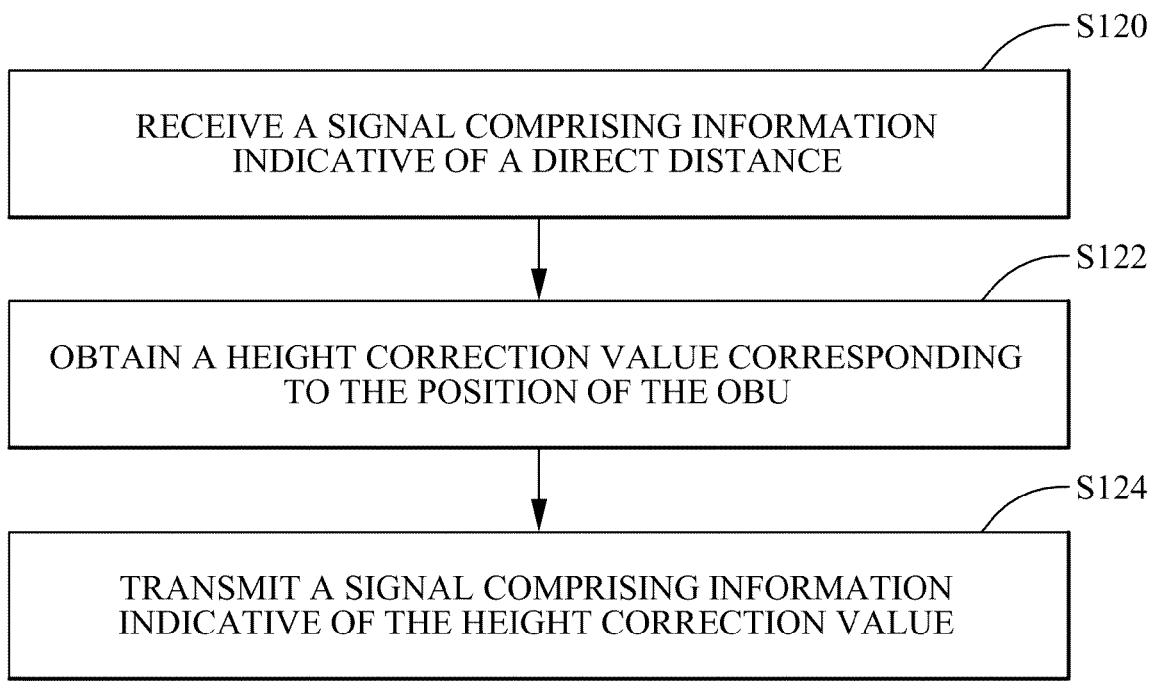
FIG. 12A is a flow diagram showing a process performed by a roadside unit in accordance with a first example embodiment herein.
Figure 13A:
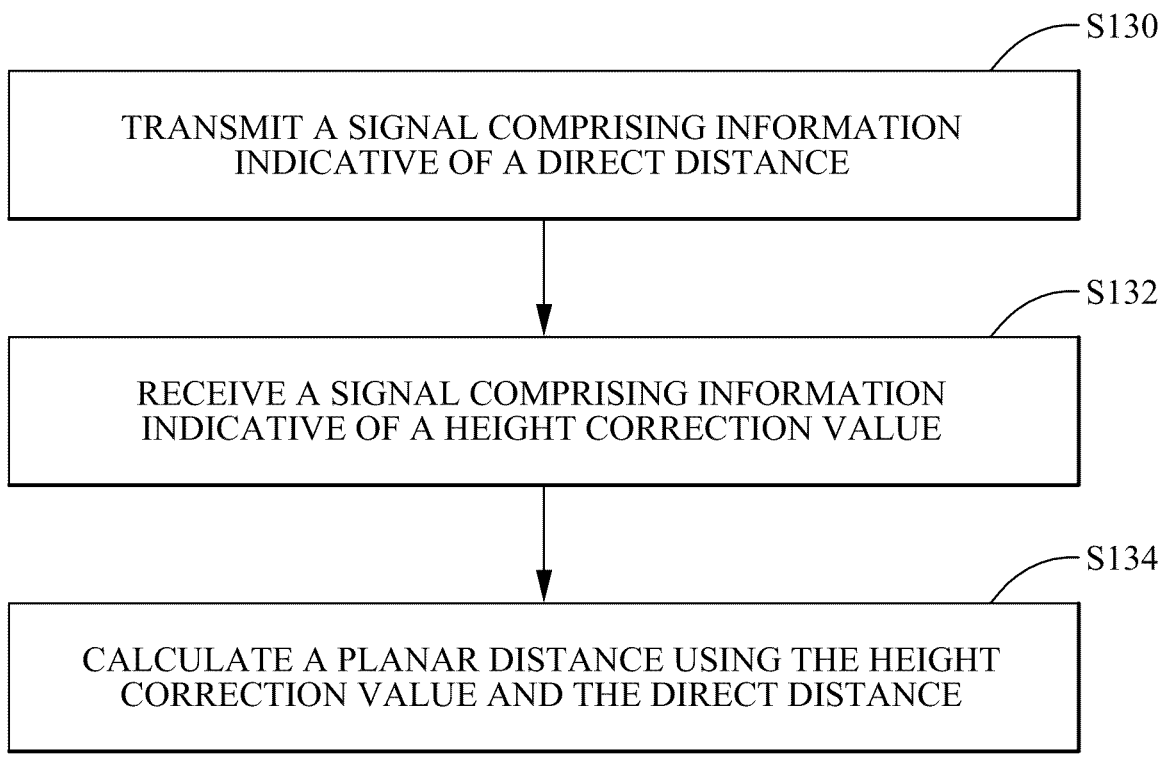
FIG. 13A is a flow diagram showing a process performed by an onboard unit in accordance with a first example embodiment herein.

FIG. 12A is a flow diagram showing a process performed by a roadside unit in accordance with a first example embodiment herein. FIG. 13A is a flow diagram showing a corresponding process performed by an onboard unit in accordance with a first example embodiment herein.

By way of example, the control unit 22 of the RSU 20 shown in FIG. 3 may control the RSU 20 to perform the process of FIG. 12A. By way of further example, the control unit 12 of the OBU 10 shown in FIG. 3 may control the OBU 10 to perform the process of FIG. 13A.

More generally, contrary to the processes of FIGS. 5 and 9, the processes of FIGS. 12A and 13A may by implemented by computing means provided in suitably configured RSUs and OBUs, i.e., V2I communication devices. As such, it is not necessary to provide specialized measurement devices to perform these processes, while still obtaining a benefit of increased accuracy in estimating position.

In process step S130 of FIG. 13A, the transmitting/receiving section 11 of the OBU 10 transmits, to the RSU 20, a signal comprising information indicative of a direct distance $D_{L2}$ between the OBU 10 and the RSU 20.

In process step S120 of FIG. 12A, the transmitting/receiving section 21 of the RSU 20 receives, from the OBU 10, the signal comprising information indicative of a direct distance $D_{L2}$ between the OBU 10 and the RSU 20.

By way of example, the OBU 20 may be configured to determine the direct distance $D_{L2}$ between the OBU 10 and the RSU 20 using time-of-flight (TOF) technology. An example process by which the direct distance $D_{L2}$ between the OBU 10 and the RSU 20 may be determined is described in relation to FIG. 14.

Figure 14:
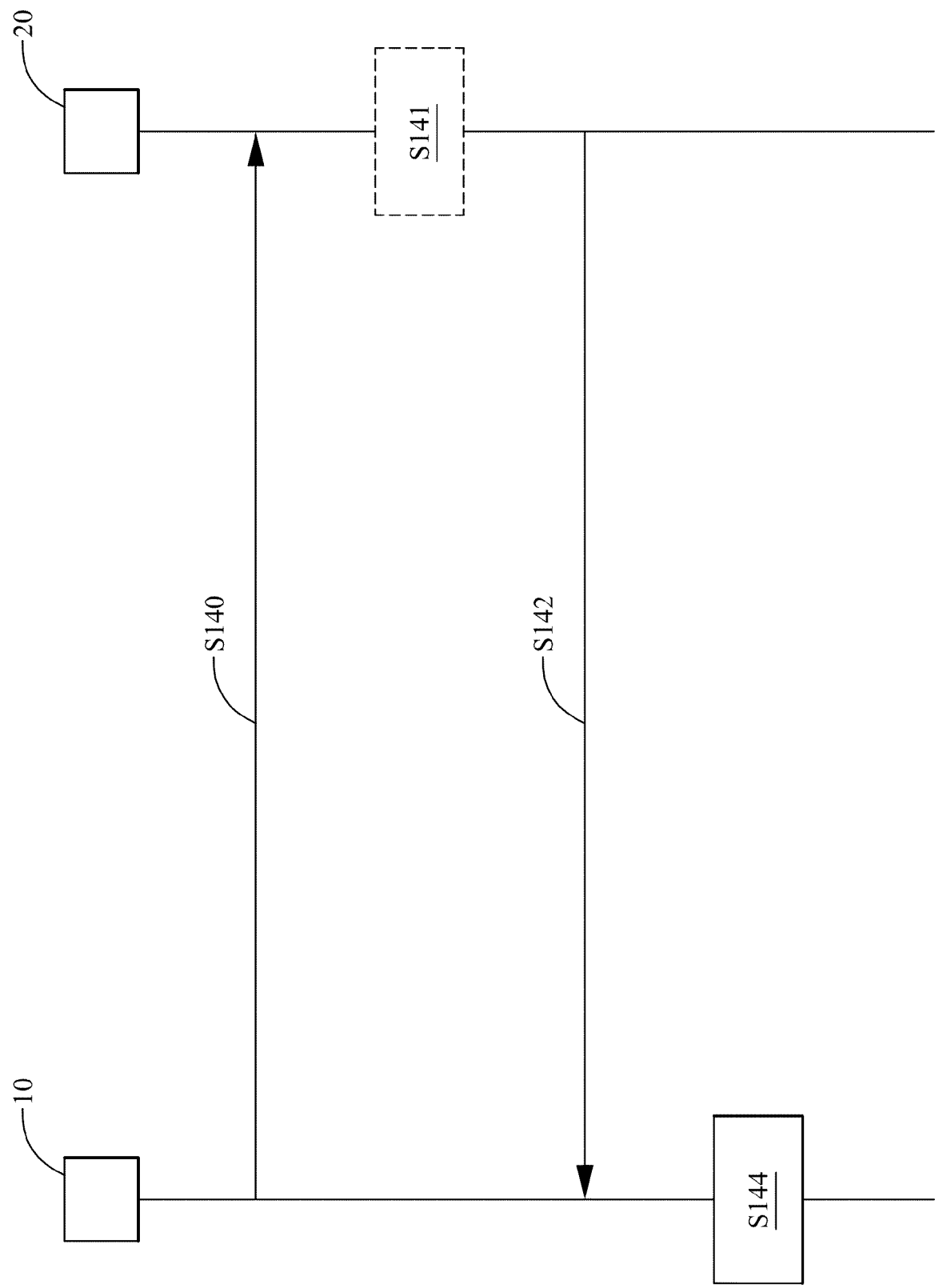
FIG. 14 illustrates an example process by which the direct distance between the OBU and the RSU may be determined.

In process step S140 of FIG. 14, the transmitting/receiving section 11 of the OBU 10 transmits, to the RSU 20, a signal comprising information identifying the OBU 10.

The information identifying the OBU 10 may have any suitable from, e.g., an index, global or local ID number, or any suitable identifier that allows the OBU to be uniquely identified, and may, for example, be transmitted as a data packet.

As discussed above in relation to FIG. 3, any suitable V2I communication standard known in the art may be used. However, the use of Impulse-Radio Ultra-Wideband (IR-UWB) communication standard may be particular advantageous as IR-UBW offers a high precision when determining the distance between two devices that communicate with each other, especially under line of sight (LOS) conditions. More generally, the signal transmitted by the OBU 10 may be considered as an electromagnetic wave that propagates outwards in all directions.

By way of example, the OBU 10 may, as in the present example, switch to a listening mode after process step 140, i.e., a mode in which the OBU 10 is specifically configured to wait for a response signal.

In process step S142 of FIG. 14, the transmitting/receiving section 21 of the RSU 20 transmits, to the OBU 10, a response signal. In particular, the response signal responds to the signal comprising the information identifying the OBU 10.

By way of example, the response signal may include information identifying the RSU 20 and/or information identifying the OBU 10.

In particular, there may be multiple RSUs within communication range of the OBU 10, each of which may receive the signal comprising the information identifying the OBU 10 from the OBU 10. Accordingly, by including the information identifying the RSU 20 in the response signal, the OBU 10 may readily determine the RSU with which it is communicating. Similarly, there may be multiple OBUs within communication range of the RSU 20, each of which may receive the response signal from the RSU 20. Accordingly, by including the information identifying the OBU 10 in the response signal, each OBU in communication range of the RSU 20 may readily determine whether or not the response signal is addressed thereto.

In process step S144, the control section 12 of the OBU 10 calculates the direct distance $D_{L2}$ between the OBU 10 and the RSU 20 based on an elapsed time between transmitting the signal and receiving the response signal. By way of example, this may be achieved using known techniques for time-of-flight technology based on the elapsed time and a known or estimated propagation speed of the signal and response signal.

Optionally, in some examples, the RSU 20 may transmits the response signal after a delay of a predetermined amount of time, as indicated by process step S141 in FIG. 14 (dashed lines indicating an optional step).

In particular, it is generally not possible for the RSU 20 to transmit the response signal at the same time as the signal comprising the information identifying the OBU 10. Instead, there will be a finite amount of time between the time at which the transmitting/receiving section 21 of the RSU 20 receives the signal and the time at which the transmitting/receiving section 21 transmits the response signal due to the need for the RSU 20 to decode the signal, generate an appropriate response, encode the response as a signal, etc. The amount of time required for such processing may vary from RSU to RSU due to, for example, differences in processing speed and environmental factors such as ambient temperature, which may affect the speed of some circuits (e.g., CMOS circuits).

Accordingly, by delaying transmitting the response signal for a predetermined amount of time, it is possible to account for variability in processing speeds at the RSU 20 end. By way of example, the predetermined amount of time may be set so as to be slightly longer than an estimated processing time of an RSU in a V2I transponder system having a slowest processing speed. As such, even though the OBU 10 is not aware of the processing time required at the RSU 20 side, the OBU 10 may simply subtract the predetermined amount of time from the elapsed time in order to more accurately determined the actual travel time of the signal and response signal. This may, in turn, result in a more accurate determination of the direct distance $D_{L2}$.

In some examples, the control section 22 of the RSU 20 may be configured to change the predetermined amount of time may be changed as ambient temperature changes. In such examples, the RSU 20 may comprise an ambient temperature sensor or be configured to receive information on the ambient temperature from another entity. This may allow the effect of changing ambient temperature on processing speed to be accounted for. By way of example, both the RSU 20 and OBU 10 may be configured to monitor ambient temperature and apply a known change to the predetermined amount of time as ambient temperature changes.

Additionally or alternatively, the response signal may further comprise information indicative of the predetermined amount of time. This may be particularly useful where the predetermined amount of time is changed as ambient temperature changes.

Ambiguity can occur with a single time-of-flight communication session and distance measurement. On the basis of such a single session, it can only be determined that RSU 20 is somewhere on a circle/sphere with the $D_{L2}$ radius from OBU 10. However, for example, it is not determinable whether RSU 20 is in front of or behind the vehicle in which OBU 10 is mounted, etc. When the vehicle travels along a certain road section, it first approaches the pole, passes it, and then moves away from it. As such, with some simplification, there may be at least two different points along the road with respect to RSU 20 where the measured value of $D_{L2}$ is identical. Furthermore, due to ambient noise, interference, etc. a single exchange of the signal and response signal between the OBU 10 and RSU 20 may not enough for precise position estimation of the OBU 10, and thereby the vehicle on which it is mounted, in the space.

Therefore, the OBU 10 may be configured to repeat the process of FIG. 14 to calculate a direct distance for each of at least two different positions of the onboard unit, the at least two different positions of the onboard unit including the position of the onboard unit.

By way of example, the OBU 10 may repeats the transmission after specified time with the RSU 20. At the same time, the vehicle, on which the OBU 10 is mounted, is moving so it can be assumed that its intermediate positions may be determined in one of the following ways:

Position change estimation ($\Delta x$ and $\Delta y$) based on the travelled distance since the last communication session between OBU and RSU. The trajectory of the vehicle from this time may be calculated precisely with the use of onboard sensors, such as yaw rate or velocity sensors.

These positions may be estimated based on the communication with the previously identified RSU that is mounted on an infrastructure element that the vehicle has already passed.

The control section 12 of the OBU 10 may be further configured to determine the position of the OBU 10 relative to the position of the RSU 20 based on the respective direct distances calculated for each of at least two different positions of the OBU 10.

In particular, based on the series of all these intermediate positions measured and the distances to the given RSU 20 measured/calculated at these positions, the control section 12 of the OBU 10 may estimate the vehicle's location with respect to the RSU. For this purpose well-known methods of triangulation or trilateration may be used.

The direct distance $D_{L2}$ indicated to the RSU 20 in process step S130 of FIG. 13A may be adjusted based on the relative position calculated in this way in order to provide a more accurate direct distance $D_{L2}$ to the RSU 20. Additionally or alternatively, the signal comprising information indicative of a direct distance $D_{L2}$ between the OBU 10 and the RSU 20 may further comprise information indicative of this relative position that may be used by the RSU 20, for example, to resolve ambiguities or otherwise improve accuracy in selecting an appropriate height correction value.

If the RSU 20 has access to the information about its own location in global coordinate system (GCS) and shares this information with the OBU 10 in the consecutive communication sessions, then the OBU 10, and thus the vehicle in which it is mounted, is able to estimate its location in GCS as well.

Returning to FIGS. 12A and 13A, more generally, the information indicative of the direct distance $D_{L2}$ between the OBU 10 and the RSU 20 may be in any suitable form that allows the RSU 20 to identify the direct distance $D_{L2}$. For example, the information may be indicated by binary data, alphanumeric characters, an index, an absolute value, etc.

In process step S122 of FIG. 12A, the control section 22 of the RSU 20 obtains, using a stored height correction function determined according to the process of FIG. 5, a height correction value corresponding to the position of the onboard unit based on the direct distance.

By way of example, as discussed above in relation to FIG. 5, this may comprise using the information indicative of the direct distance $D_{L2}$ as a key to access a height correction function in the form of an LUT or as a variable in a height correction function in the form of a mathematical function. Optionally, in cases where the height correction function is in the form of an LUT and the information indicative of the direct distance $D_{L2}$ does not correspond to any of the vehicle positions $P_i$ for which a height correction value is stored, the control section 22 of the RSU 20 may be configured to interpolate between the two closest values of direct distance or to select a height correction value associated with a closest value of direct distance in the LUT.

In process step S124 of FIG. 12A, the transmitting/receiving section 21 of the RSU 21 transmits, to the OBU 10, a signal comprising information indicative of the height correction value. The height correction value may, for example, have any of the forms discussed above in relation to process step S54 of FIG. 5 and may be packetized and/or encoded for transmission using any suitable means known in the art.

In process step S132 of FIG. 13A, the transmitting/receiving section 11 of the OBU 10 receives, from the RSU 20, the signal comprising the information indicative of the height correction value.

In process step S134 of FIG. 13A, the control section 12 of the OBU 10 calculates a planar distance $D_P$ using the height correction value and the direct distance.

By way of example, in a case where the height correction value is the actual height $H_i$ of the roadside unit relative to the vehicle position $P_i$, the planar distance $D_P$ may be calculated using Pythagoras theorem as:

$$D_P = \sqrt{D_{L2}^2 - H_i^2} \tag{8}$$

By way of further example, in a case where the height correction value is the difference $\Delta H_i$ between the height $H_i$ of the roadside unit relative to the vehicle position $P_i$ and the predetermined height H at which the RSU 20 is mounted, the planar distance $D_P$ may be calculated using Pythagoras theorem as:

$$D_P = \sqrt{D_{L2}^2 - (\Delta H_i + H)^2} \tag{9}$$

Equations (8) and (9) may be adapted as appropriate for alternative forms of the height correction value.

Accordingly, the complementary processes of FIGS. 12A and 13A allow a determined height correction function stored in the RSU 20 to be used to compensate for the unevenness of the terrain in the vicinity of that RSU 20 when determining a planar distance between that RSU 20 and an OBU 10 by identifying an appropriate height correction value for a given vehicle position.

Figure 12B:
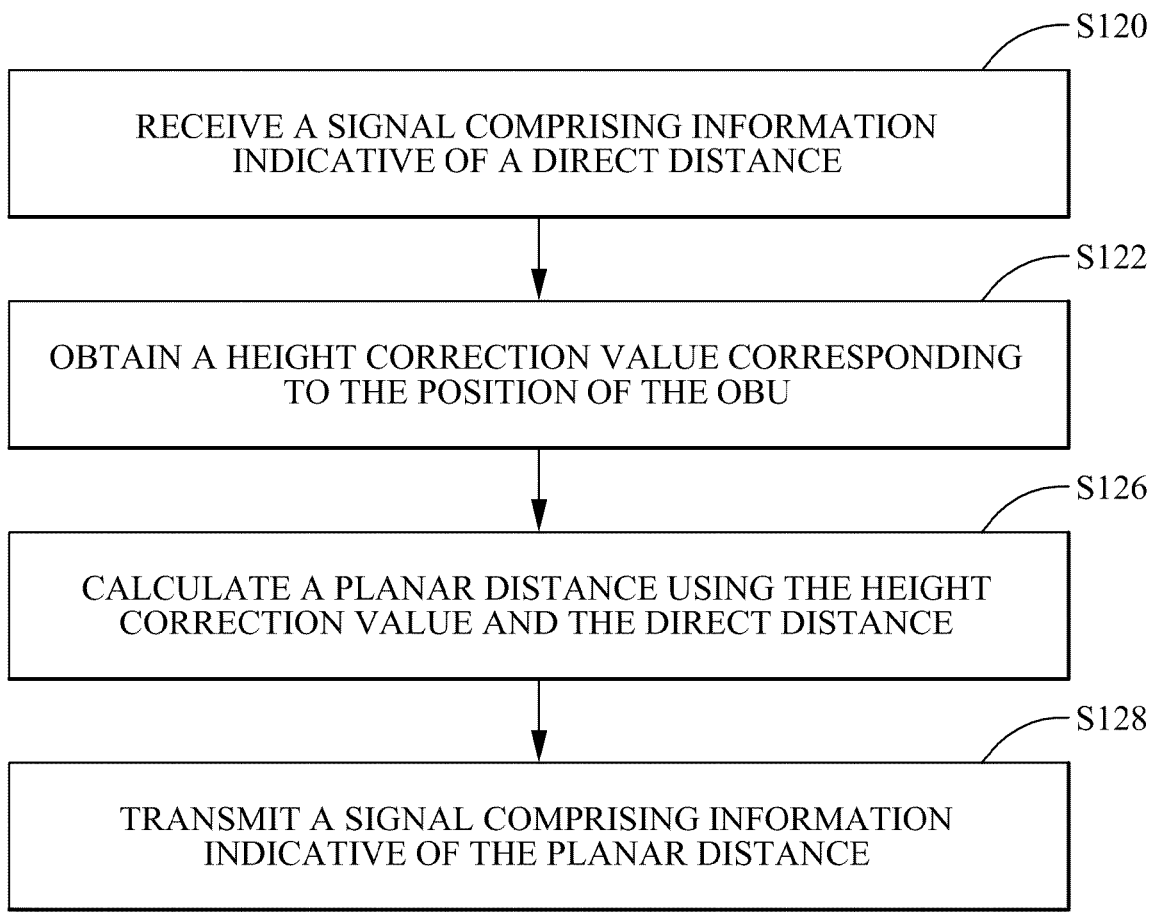
FIG. 12B is a flow diagram showing a process performed by a roadside unit in accordance with a second example embodiment herein.

FIG. 12B is a flow diagram showing a process performed by a roadside unit in accordance with a second example embodiment herein.

Figure 13B:
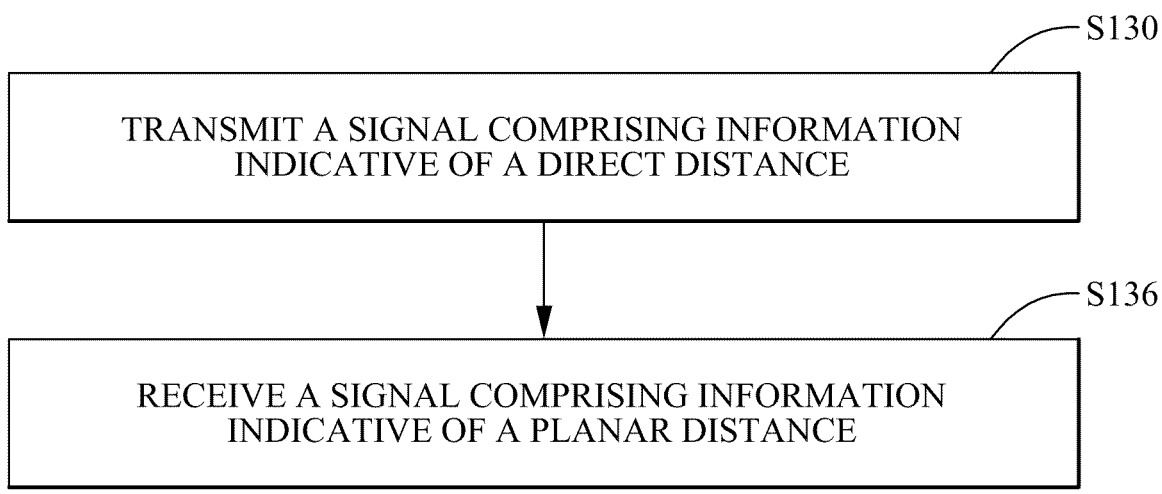
FIG. 13B is a flow diagram showing a process performed by an onboard unit in accordance with a second example embodiment herein.

FIG. 13B is a flow diagram showing a corresponding process performed by an onboard unit in accordance with a second example embodiment herein.

By way of example, the control unit 22 of the RSU 20 shown in FIG. 3 may control the RSU 20 to perform the process of FIG. 12B. By way of further example, the control unit 12 of the OBU 10 shown in FIG. 3 may control the OBU 10 to perform the process of FIG. 13B.

More generally, contrary to the processes of FIGS. 5 and 9, the processes of FIGS. 12B and 13B may by implemented by computing means provided in suitably configured RSUs and OBUs. As such, it is not necessary to provide specialized measurement devices to perform these processes.

Process step S130 of FIG. 13B and process steps S120 and S122 of FIG. 12B correspond to process step S130 of FIG. 13A and process steps S120 and S122 of FIG. 12A, respectively. The description of these steps of FIGS. 12A and 13A apply equally to the corresponding steps of FIGS. 12B and 13B.

In process step S126 of FIG. 12B, the control section 22 of the RSU 20 calculates a planar distance $D_P$ using the height correction value obtained in process step S122 and the direct distance received in process step S120. The planar distance $D_P$ may, for example, be calculated as described above in relation to process step S134 of FIG. 13A.

In process step S128 of FIG. 12B, the transmitting/receiving section 21 of the RSU 20 transmits, to the OBU 10, a signal comprising information indicative of the planar distance $D_P$. The information indicative of the planar distance $D_P$ may be packetized and/or encoded for transmission using any suitable means known in the art.

In process step S136 of FIG. 13B, the transmitting/receiving section 11 of the OBU 10 receives, from the RSU 20, the signal comprising information indicative of the planar distance $D_P$ calculated using the obtained height correction value.

Accordingly, the complementary processes of FIGS. 12B and 13B allow a determined height correction function stored in the RSU 20 to be used to compensate for the unevenness of the terrain in the vicinity of that RSU 20 when determining a planar distance between that RSU 20 and an OBU 10 by identifying an appropriate height correction value for a given vehicle position.

FIG. 15 is a flow diagram illustrating a process performed by an RSU (e.g., RSU 20), in accordance with an example embodiment herein.

In process step S150 of FIG. 15, the control section 22 of the RSU 20 determines a target position of the onboard unit. By way of example, the target position may be a next position in a trajectory determined to cause the vehicle to follow an intended route.

By way of example, the RSU 20 may have been previously provided with an indication of the position of the OBU 10 to the RSU 20. For example, the RSU 20 may have obtained at least one of the direct distances $D_{L2}$ between the OBU 10 and the RSU 20, the planar distance $D_P$ between the OBU 10 and the RSU 20, the coordinates of each of the OBU 10 and the RSU 20 in a GCS, LCS or other suitable coordinate system, etc. determined in accordance with any of the means described herein and may use this information (together with any information of the vehicle's intended route) to determine the target position.

In process step S152 of FIG. 15, the control unit 22 of the RSU 20 obtains, using a stored curvature correction function determined according to the process of FIG. 9, a first lateral distance value $\Delta y$ and a first longitudinal distance value $\Delta x$ corresponding to the position of the onboard unit and a second lateral distance value $\Delta y_T$ and a second longitudinal distance value $\Delta x_T$ corresponding to the target position.

In process step S154 of FIG. 15, the control section 22 of the RSU 20 calculates a target turning angle and a target distance based on the first lateral distance value $\Delta y$, the first longitudinal distance value $\Delta x$, the second lateral distance value $\Delta y_T$, and the second longitudinal distance value $\Delta x_T$.

By way of example, FIG. 16 illustrates an example of values $\Delta x_i$ and $\Delta y_i$ between two consecutive vehicle positions $p_i$ and $p_{i-1}$ and values $\Delta x_{i-1}$ and $\Delta y_{i-1}$ between two consecutive vehicle positions $p_{i-1}$ and $p_{i-2}$.

In process step S156 of FIG. 15, the transmitting/receiving section 21 of the RSU 20 transmits, to the OBU 10, information indicative of the target turning angle and the target distance for use in controlling a vehicle, in which the OBU 10, is mounted to travel towards the target position.

By way of example, the information indicative of the target turning angle and the target distance may be packetized and/or encoded for transmission using any suitable means known in the art. Furthermore, the information indicative of the target turning angle and the target distance may have any suitable form that allows the OBU 10 to identify or derive the turning angle and distance to travel to reach the target position, e.g., coordinates of the current and target position, an instruction to accelerate in a particular direction for a particular time, etc.

The transmitting/receiving section 11 of the OBU 10 receives, from the RSU 20, the information indicative of the target turning angle and the target distance. The OBU 10 may use this information for controlling the vehicle to travel towards the target position, for example, by providing the information to other ADAS modules of the vehicle which control the steering and acceleration of the vehicle.

Accordingly, the process of FIG. 15 allows a determined curvature correction function stored in the RSU 20 to be used to compensate for the curvature of the road in the vicinity of that RSU by identifying an appropriate height correction value for a given vehicle position. This may, in turn, allow the relative position of the OBU 10 relative to the RSU 20 and the target position in a high-level environment model to be more accurately specified and, thus, the precision of vehicle location estimation and autonomous control to be improved.

As the information provided to the OBU 10 in accordance with the process of FIG. 15 may enable an ADAS system in a vehicle, in which the OBU 10, is mounted to control the vehicle to travel towards a target position, the process of FIG. 15 may contribute to the creation of virtual tracks. By way of example, the process of FIG. 15 may be repeated for multiple target positions such that the vehicle is caused to follow a predefined course on a road by moving from one target position to the next. Additionally or alternatively, an OBU 10 may interact with multiple RSUs, each of which performs the process of FIG. 15, such that the vehicle is caused to follow a predefined course on a road along which multiple RSUs are installed.

The function of providing information for using in controlling vehicle, in which an OBU is mounted, to travel towards the target position, from an RSU may have many applications.

One of the possibilities is supporting ADAS functions which provide assistance in passing junctions, roundabouts, and other intersections. These are critical nodes (mainly in cities) at which the safety issues are of a major concern. Using the techniques described herein, a vehicle, knowing its destination and an intended route to reach this destination may use V2I technology to obtain the set of precise intermediate points that will form its trajectory, for example, in the vicinity of junctions or roundabouts. In this way, the vehicle in which an OBU is mounted may be guided through such an intersection.

Another possibility is to use the proposed solution in a hybrid communication system covering both private transport and public means of transport. The situation is especially important when commuting to larger cities from suburban areas, which a large proportion of people travel by train. However, it is not always possible to build a car park directly at the railway station, which creates an organizational problem. One possible solution to this problem is to create parking lots at a certain distance from the train station and transport commuters from the parking lots to the station using autonomous vehicles. In this case, the transport would take place over relatively short distances, additionally at a limited speed. Autonomous vehicles that would take part in such transport could in this case move along strictly delineated routes, appropriately equipped with RSU-V2I sensors, which would precisely define the position of these vehicles on a given road section.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included, or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the above-described example embodiments are not limiting.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on the scope of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A method of determining a height correction function associating each of a plurality of vehicle positions to a respective height correction value, the plurality of vehicle positions being within a predetermined region defined relative to a roadside unit, the method comprising:
   determining, for each of the plurality of vehicle positions, a direct distance, the determined direct distance between the vehicle position and a position of the roadside unit;
   determining, for each of the plurality of vehicle positions, a planar distance, the determined planar distance between the vehicle position in a horizontal plane containing the vehicle position and a projection of the position of the roadside unit onto the horizontal plane;
   calculating, for each of the plurality of vehicle positions, a height of the roadside unit relative to the vehicle position using the direct distance and the planar distance determined for the vehicle position;
   setting, for each of the plurality of vehicle positions, a value indicative of the height of the roadside unit relative to the vehicle position as a height correction value; and
   storing in the roadside unit, for each of the plurality of vehicle positions, the height correction value of the vehicle position in association with information indicative of the vehicle position as the height correction function.

2. The method according to claim 1, wherein the roadside unit is positioned at a predetermined height relative to ground level, and the method further comprises:
   calculating, for each of the plurality of vehicle positions, a difference between the height of the roadside unit relative to the vehicle position and the predetermined height,
   wherein, for each of the plurality of vehicle positions, the value indicative of the height of the roadside unit relative to the vehicle position is the difference calculated for the vehicle position.

3. The method according to claim 1, wherein, for each of the plurality of vehicle positions, the information indicative of the vehicle position comprises at least one of:
   the direct distance between the vehicle position and the roadside unit, or
   the height correction function is stored in the roadside unit in the form of a look-up table.

4. The method according to claim 1, wherein, for each of the plurality of vehicle positions, the direct distance is determined using at least one of a time-of-flight sensor or a laser rangefinder.

5. The method according to claim 4, wherein, for each of the plurality of vehicle positions the planar distance is determined using a laser rangefinder.

6. The method according to claim 1, wherein, for each of the plurality of vehicle positions the planar distance is determined using a laser rangefinder.

7. The method according to claim 1, further comprising:

receiving, from an onboard unit, a signal comprising information indicative of a direct distance between the onboard unit and the roadside unit;

obtaining, using the height correction function, a height correction value corresponding to the position of the onboard unit based on the direct distance between the onboard unit and the roadside unit;

calculating, using the height correction value and the direct distance between the onboard unit and the roadside unit, a second planar distance between a position of an onboard unit in a horizontal plane containing the position of the onboard unit, and a projection of a position of the roadside unit onto the horizontal plane; and transmitting, to the onboard unit, a signal comprising information indicative of the second planar distance.

8. The method according to claim 7, wherein:
the roadside unit is positioned at a predetermined height relative to ground level;
the height correction value comprises a difference between a height of the roadside unit relative to the position of the onboard unit and the predetermined height; and
calculating the second planar distance further comprises using the predetermined height.

9. The method according to claim 1, further comprising:
receiving, from an onboard unit, a signal comprising information indicative of a direct distance between the onboard unit and the roadside unit;
obtaining, using the height correction function, a height correction value corresponding to the position of the onboard unit based on the direct distance between the onboard unit and the roadside unit; and
transmitting, to the onboard unit, a signal comprising information indicative of the height correction value.

10. The method according to claim 9, further comprising:
receiving, from the onboard unit, at least one signal comprising information identifying the onboard unit; and
transmitting, to the onboard unit, a response signal in respect of each of the at least one signal.

11. The method according to claim 10, wherein each response signal includes at least one of information identifying the roadside unit or information identifying the onboard unit.

12. The method according to claim 1, wherein the roadside unit comprises a transmitting/receiving section, a control section, and a memory section,
wherein the operation of determining the height correction function associating each of the plurality of vehicle positions to the respective height correction value is performed by the control section of the roadside unit.

13. The method according to claim 1, further comprising determining a planar distance between a position of an onboard unit in a horizontal plane containing the position of the onboard unit and a projection of a position of a roadside unit onto the horizontal plane, the method comprising:
transmitting, by the onboard unit to the roadside unit, a signal comprising information indicative of a direct distance between the onboard unit and the roadside unit;
wherein the method further comprises at least one of:
receiving, from the roadside unit, a signal comprising information indicative of a height correction value corresponding to a position of the onboard unit based on the direct distance between the onboard unit and the roadside unit and obtained using the height correction function and calculating a planar distance using the height correction value and the direct distance; or
receiving, from the roadside unit, a signal comprising information indicative of the planar distance calculated using the height correction value.

14. The method according to claim 13, further comprising:
defining a recursive procedure that includes operations a-c:
  a. transmitting, to the roadside unit, a signal comprising information identifying the onboard unit;
  b. receiving, from the roadside unit, a response signal; and
  c. calculating a calculated direct distance between the onboard unit and the roadside unit based on an elapsed time between transmitting the signal and receiving the response signal; and
performing the recursive procedure.

15. The method according to claim 14, further comprising:
performing the recursive procedure again to calculate another direct distance for each of at least two different positions of the onboard unit, the at least two different positions of the onboard unit including the position of the onboard unit; and
determining the position of the onboard unit relative to the position of the roadside unit based on the respective calculated direct distances calculated for each of at least two different positions of the onboard unit.

16. The method according to claim 15, wherein the signal comprising information indicative of a direct distance between the onboard unit and the roadside unit includes information indicative of the position of the onboard unit relative to the position of the roadside unit.

17. The method according to claim 13, further comprising:
receiving, from the roadside unit, information indicative of a target turning angle and a target distance for use in controlling a vehicle in which the onboard unit is mounted to travel towards a target position.

18. The method according to claim 13, wherein the onboard unit comprises a transmitting/receiving section, a control section, and a memory section,
wherein the operation of determining a planar distance between a position of an onboard unit in a horizontal plane containing the position of the onboard unit and a projection of a position of a roadside unit onto the horizontal plane is performed by the control section of the onboard unit.

19. A method of determining a curvature correction function associating each of a plurality of vehicle positions to a respective lateral distance value and a respective longitudinal distance value, the plurality of vehicle positions being within a predetermined region defined relative to a roadside unit and including a sequence of positions defining a trajectory of a vehicle along a road, each of the plurality of vehicle positions having an associated direction of travel, the method comprising:
determining, for each pair of consecutive vehicle positions among the plurality of vehicle positions, an angular distance between the respective directions of travel associated with the pair of consecutive vehicle positions;
calculating, for each of the plurality of vehicle positions, a total angular distance between the direction of travel associated with the vehicle position and a direction of travel associated with a vehicle position closest to a position of the roadside unit;
calculating, for each of the plurality of vehicle positions, the lateral distance value based on the total angular distance and a planar distance between the vehicle position in a horizontal plane containing the vehicle position and a projection of the position of the roadside unit onto the horizontal plane;
calculating, for each of the plurality of vehicle positions, the longitudinal distance value based on the total angular distance and the planar distance between the vehicle position in the horizontal plane containing the vehicle position and the projection of the position of the roadside unit onto the horizontal plane; and storing in the roadside unit, for each of the plurality of vehicle positions, the lateral distance value and the longitudinal distance value of the vehicle position in association with information indicative of the vehicle position as the curvature correction function.

20. The method according to claim 19, further comprising:

determining a target position of an onboard unit;

obtaining, using the curvature correction function, a first lateral distance value and a first longitudinal distance value corresponding to a position of the onboard unit and a second lateral distance value and a second longitudinal distance value corresponding to the target position;

calculating a target turning angle and a target distance based on the first lateral distance value, the first longitudinal distance value, the second lateral distance value, and the second longitudinal distance value; and transmitting, to the onboard unit, information indicative of the target turning angle and the target distance for use in controlling a vehicle in which the onboard unit is mounted to travel towards the target position.

* * * * *